US006956878B1

(12) United States Patent
Trisnadi

(10) Patent No.: US 6,956,878 B1
(45) Date of Patent: Oct. 18, 2005

(54) METHOD AND APPARATUS FOR REDUCING LASER SPECKLE USING POLARIZATION AVERAGING

(75) Inventor: Jahja I. Trisnadi, Cupertino, CA (US)

(73) Assignee: Silicon Light Machines Corporation, Sunnyvale, CA (US)

(*) Notice: Subject to any disclaimer, the term of this patent is extended or adjusted under 35 U.S.C. 154(b) by 0 days.

(21) Appl. No.: 09/498,703

(22) Filed: Feb. 7, 2000

(51) Int. Cl.[7] .............................. H01S 3/10; H01S 3/08
(52) U.S. Cl. .......................... 372/27; 372/26; 372/28; 372/101; 372/108
(58) Field of Search .......................... 372/27, 12, 14, 372/101, 105, 106–108, 15, 17, 23, 24, 9, 372/26, 28, 99, 100; 359/618, 483, 237, 246, 359/712, 279, 438

(56) References Cited

U.S. PATENT DOCUMENTS

| | | | |
|---|---|---|---|
| 3,941,456 A | 3/1976 | Schilz et al. | 350/161 |
| 4,034,399 A | 7/1977 | Drukier et al. | 357/68 |
| 4,035,068 A | 7/1977 | Rawson | 353/122 |
| 4,067,129 A | 1/1978 | Abramson et al. | 40/563 |
| 4,084,437 A | 4/1978 | Finnegan | 73/361 |
| 4,090,219 A | 5/1978 | Ernstoff et al. | 358/59 |
| 4,093,346 A | 6/1978 | Nishino et al. | 350/162 SF |
| 4,093,921 A | 6/1978 | Buss | 325/459 |
| 4,093,922 A | 6/1978 | Buss | 325/459 |
| 4,100,579 A | 7/1978 | Ernstoff | 358/230 |
| 4,103,273 A | 7/1978 | Keller | 338/2 |

(Continued)

FOREIGN PATENT DOCUMENTS

JP 404175607 A * 6/1992

(Continued)

OTHER PUBLICATIONS

Glenn et al, Efficient Liquid Crystal Valves, Feb. 8, 1995, Proceedings of SPIE, v 2407, p 198-213.*

(Continued)

Primary Examiner—Minsun O. Harvey
Assistant Examiner—Armando Rodriguez
(74) Attorney, Agent, or Firm—Okamoto & Benedicto LLP

(57) ABSTRACT

A method and apparatus for reducing speckle uses polarization averaging. A polarizing beam splitter divides a first polarized laser output into a second polarized laser output and a third polarized laser output. A plurality of mirrors creates an optical path difference between the second and third polarized laser outputs. The optical path difference is at least about a coherence length for the first polarized laser output. The second and third polarized laser outputs are combined into a fourth laser output, which illuminates a depolarizing screen. If a human eye or an optical system having a intensity detector views the depolarizing screen, the eye or the intensity detector will detect reduced speckle, which results from uncorrelated speckle patterns created by the second polarized laser output and the third polarized laser output. A first alternative embodiment of the invention functions without the optical path difference being at least about the coherence length. In the first alternative embodiment, a piezoelectric transducer varies an optical path length by at least about a half wavelength of the first polarized laser output. By varying the optical path length by a sufficient frequency, the eye or the intensity detector will detect the reduced speckle. A second alternative embodiment combines two orthogonally polarized laser outputs, from two lasers, into a combined laser output. The combined laser output illuminates the depolarizing screen. A third alternative embodiment rotates the first laser output with a rotation frequency to form a rotating polarized laser output, which illuminates the depolarizing screen.

33 Claims, 13 Drawing Sheets

U.S. PATENT DOCUMENTS

| | | | |
|---|---|---|---|
| 4,126,380 A | 11/1978 | Borm | 350/266 |
| 4,127,322 A | 11/1978 | Jacobson et al. | 353/31 |
| 4,135,502 A | 1/1979 | Peck | 128/76.5 |
| 4,139,257 A | 2/1979 | Matsumoto | 350/6.1 |
| 4,143,943 A | 3/1979 | Rawson | 350/120 |
| 4,163,570 A | 8/1979 | Greenaway | 282/8 A |
| 4,184,700 A | 1/1980 | Greenaway | 283/6 |
| 4,185,891 A | 1/1980 | Kaestner | 350/167 |
| 4,190,855 A | 2/1980 | Inoue | 357/80 |
| 4,195,915 A | 4/1980 | Lichty et al. | 350/345 |
| 4,205,428 A | 6/1980 | Ernstoff et al. | 29/592 R |
| 4,211,918 A | 7/1980 | Nyfeler et al. | 235/454 |
| 4,223,050 A | 9/1980 | Nyfeler et al. | 427/163 |
| 4,225,913 A | 9/1980 | Bray | 363/97 |
| 4,249,796 A | 2/1981 | Sincerbox et al. | 350/370 |
| 4,250,217 A | 2/1981 | Greenaway | 428/161 |
| 4,250,393 A | 2/1981 | Greenaway | 250/566 |
| 4,256,787 A | 3/1981 | Shaver et al. | 428/1 |
| 4,257,016 A | 3/1981 | Kramer, Jr. et al. | 322/7.51 |
| 4,290,672 A | 9/1981 | Whitefield | 350/358 |
| 4,295,145 A | 10/1981 | Latta | 346/108 |
| 4,311,999 A | 1/1982 | Upton et al. | 340/755 |
| 4,327,411 A | 4/1982 | Turner | 364/900 |
| 4,327,966 A | 5/1982 | Bloom | 350/162 R |
| 4,331,972 A | 5/1982 | Rajchman | 358/60 |
| 4,336,982 A | 6/1982 | Rector, Jr. | 350/358 |
| 4,338,660 A | 7/1982 | Kelley et al. | 364/200 |
| 4,343,535 A | 8/1982 | Bleha, Jr. | 350/342 |
| 4,346,965 A | 8/1982 | Sprague et al. | 350/358 |
| 4,348,079 A | 9/1982 | Johnson | 350/358 |
| 4,355,463 A | 10/1982 | Burns | 29/827 |
| 4,361,384 A | 11/1982 | Bosserman | 350/174 |
| 4,369,524 A | 1/1983 | Rawson et al. | 455/606 |
| 4,374,397 A | 2/1983 | Mir | 358/75 |
| 4,389,096 A | 6/1983 | Hori et al. | 350/339 R |
| 4,391,490 A | 7/1983 | Hartke | 350/356 |
| 4,396,246 A | 8/1983 | Holman | 350/96.14 |
| 4,398,798 A | 8/1983 | Krawczak et al. | 350/162.24 |
| 4,400,740 A | 8/1983 | Traino et al. | 358/293 |
| 4,408,884 A | 10/1983 | Kleinknecht et al. | 356/355 |
| 4,414,583 A | 11/1983 | Hooker, III | 358/300 |
| 4,417,386 A | 11/1983 | Exner | 29/590 |
| 4,418,397 A | 11/1983 | Brantingham et al. | 364/900 |
| 4,420,717 A | 12/1983 | Wallace et al. | 318/696 |
| 4,422,099 A | 12/1983 | Wolfe | 358/293 |
| 4,426,768 A | 1/1984 | Black et al. | 29/583 |
| 4,430,584 A | 2/1984 | Someshwar et al. | 307/465 |
| 4,435,041 A | 3/1984 | Torok et al. | 350/162.24 |
| 4,440,839 A | 4/1984 | Mottier | 430/2 |
| 4,443,819 A | 4/1984 | Funada et al. | 358/236 |
| 4,443,845 A | 4/1984 | Hamilton et al. | 364/200 |
| 4,447,881 A | 5/1984 | Brantingham et al. | 364/488 |
| 4,454,591 A | 6/1984 | Lou | 364/900 |
| 4,456,338 A | 6/1984 | Gelbart | 350/358 |
| 4,460,907 A | 7/1984 | Nelson | 346/153.1 |
| 4,462,046 A | 7/1984 | Spight | 358/101 |
| 4,467,342 A | 8/1984 | Tower | 357/30 |
| 4,468,725 A | 8/1984 | Venturini | 363/160 |
| 4,483,596 A | 11/1984 | Marshall | 350/385 |
| 4,484,188 A | 11/1984 | Ott | 340/728 |
| 4,487,677 A | 12/1984 | Murphy | 204/247 |
| 4,492,435 A | 1/1985 | Banton et al. | 350/360 |
| 4,503,494 A | 3/1985 | Hamilton et al. | 364/200 |
| 4,511,220 A * | 4/1985 | Scully | 350/403 |
| 4,538,883 A | 9/1985 | Sprague et al. | 350/356 |
| 4,545,610 A | 10/1985 | Lakritz et al. | 29/589 |
| 4,556,378 A | 12/1985 | Nyfeler et al. | 425/143 |
| 4,558,171 A | 12/1985 | Gantley et al. | 174/52 FP |
| 4,561,011 A | 12/1985 | Kohara et al. | |
| 4,561,044 A | 12/1985 | Ogura et al. | 362/84 |
| 4,566,935 A | 1/1986 | Hornbeck | 156/626 |
| 4,567,585 A | 1/1986 | Gelbart | 369/97 |
| 4,571,041 A | 2/1986 | Gaudyn | 353/10 |
| 4,571,603 A | 2/1986 | Hornbeck et al. | 346/160 |
| 4,577,932 A | 3/1986 | Gelbart | 350/358 |
| 4,577,933 A | 3/1986 | Yip et al. | 350/358 |
| 4,588,957 A | 5/1986 | Balant et al. | 330/4.3 |
| 4,590,548 A | 5/1986 | Maytum | 363/161 |
| 4,594,501 A | 6/1986 | Culley et al. | 219/492 |
| 4,596,992 A | 6/1986 | Hornbeck | 346/76 PH |
| 4,615,595 A | 10/1986 | Hornbeck | 353/122 |
| 4,623,219 A | 11/1986 | Trias | 350/351 |
| 4,636,039 A | 1/1987 | Turner | 350/356 |
| 4,636,866 A | 1/1987 | Hattori | 358/236 |
| 4,641,193 A | 2/1987 | Glenn | 358/233 |
| 4,645,881 A | 2/1987 | LeToumelin et al. | 379/252 |
| 4,646,158 A | 2/1987 | Ohno et al. | 358/236 |
| 4,649,085 A | 3/1987 | Landram | 428/620 |
| 4,649,432 A | 3/1987 | Watanabe | 358/241 |
| 4,652,932 A | 3/1987 | Miyajima et al. | 358/236 |
| 4,655,539 A | 4/1987 | Caulfield et al. | 350/3.6 |
| 4,660,938 A | 4/1987 | Kazan | 350/355 |
| 4,661,828 A | 4/1987 | Miller, Jr. et al. | 346/108 |
| 4,662,746 A | 5/1987 | Hornbeck | 350/269 |
| 4,663,670 A | 5/1987 | Ito et al. | 358/245 |
| 4,687,326 A | 8/1987 | Corby, Jr. | 356/5 |
| 4,698,602 A | 10/1987 | Armitage | 332/7.51 |
| 4,700,276 A | 10/1987 | Freyman et al. | 361/403 |
| 4,707,064 A | 11/1987 | Dobrowolski et al. | 350/96.19 |
| 4,709,995 A | 12/1987 | Kuribayashi et al. | 350/350 |
| 4,710,732 A | 12/1987 | Hornbeck | 332/7.51 |
| 4,711,526 A | 12/1987 | Hennings et al. | 350/170 |
| 4,714,326 A | 12/1987 | Usui et al. | 350/485 |
| 4,717,066 A | 1/1988 | Goldenberg et al. | 228/179 |
| 4,719,507 A | 1/1988 | Bos | 358/92 |
| 4,721,629 A | 1/1988 | Sakai et al. | 427/35 |
| 4,722,593 A | 2/1988 | Shimazaki | 350/336 |
| 4,724,467 A | 2/1988 | Yip et al. | 355/71 |
| 4,728,185 A | 3/1988 | Thomas | 353/122 |
| 4,743,091 A | 5/1988 | Gelbart | 350/252 |
| 4,744,633 A | 5/1988 | Sheiman | 350/132 |
| 4,747,671 A | 5/1988 | Takahashi et al. | 350/336 |
| 4,751,509 A | 6/1988 | Kubota et al. | 340/784 |
| 4,761,253 A | 8/1988 | Antes | 264/1.3 |
| 4,763,975 A | 8/1988 | Scifres et al. | 350/96.15 |
| 4,765,865 A | 8/1988 | Gealer et al. | 156/647 |
| 4,772,094 A | 9/1988 | Sheiman | 350/133 |
| 4,797,694 A | 1/1989 | Agostinelli et al. | 346/160 |
| 4,797,918 A | 1/1989 | Lee et al. | 380/20 |
| 4,801,194 A | 1/1989 | Agostinelli et al. | 350/356 |
| 4,803,560 A | 2/1989 | Matsunaga et al. | 359/236 |
| 4,804,641 A | 2/1989 | Arlt et al. | 437/227 |
| 4,807,021 A | 2/1989 | Okumura | 357/75 |
| 4,807,965 A | 2/1989 | Garakani | 350/131 |
| 4,809,078 A | 2/1989 | Yabe et al. | 358/236 |
| 4,811,082 A | 3/1989 | Jacobs et al. | 357/80 |
| 4,811,210 A | 3/1989 | McAulay | 364/200 |
| 4,814,759 A | 3/1989 | Gombrich et al. | 340/771 |
| 4,817,850 A | 4/1989 | Wiener-Avnear et al. | 228/119 |
| 4,824,200 A | 4/1989 | Isono et al. | 350/96.16 |
| 4,827,391 A | 5/1989 | Sills | 363/41 |
| 4,829,365 A | 5/1989 | Eichenlaub | 358/3 |
| 4,836,649 A | 6/1989 | Ledebuhr et al. | 350/331 R |
| 4,856,863 A | 8/1989 | Sampsell et al. | 350/96.16 |
| 4,856,869 A | 8/1989 | Sakata et al. | 350/162.18 |
| 4,859,012 A | 8/1989 | Cohn | 350/96.24 |
| 4,859,060 A | 8/1989 | Katagiri et al. | 356/352 |
| 4,866,488 A | 9/1989 | Frensley | 357/4 |
| 4,882,683 A | 11/1989 | Rupp et al. | 364/521 |
| 4,893,509 A | 1/1990 | MacIver et al. | 73/517 AV |
| 4,896,325 A | 1/1990 | Coldren | 372/20 |
| 4,896,948 A | 1/1990 | Dono et al. | 350/355 |
| 4,897,708 A | 1/1990 | Clements | 357/65 |
| 4,902,083 A | 2/1990 | Wells | 350/6.6 |

| Patent | Date | Inventor | Class |
|---|---|---|---|
| 4,915,463 A | 4/1990 | Barbee, Jr. | 350/1.1 |
| 4,915,479 A | 4/1990 | Clarke | 350/345 |
| 4,924,413 A | 5/1990 | Suwannukul | 364/521 |
| 4,926,241 A | 5/1990 | Carey | 357/75 |
| 4,930,043 A | 5/1990 | Wiegand | 361/283 |
| 4,934,773 A | 6/1990 | Becker | 350/6.6 |
| 4,940,309 A | 7/1990 | Baum | 350/171 |
| 4,943,815 A | 7/1990 | Aldrich et al. | 346/108 |
| 4,945,773 A | 8/1990 | Sickafus | 73/862.59 |
| 4,949,148 A | 8/1990 | Bartelink | 357/74 |
| 4,950,890 A | 8/1990 | Gelbart | 250/237 G |
| 4,952,925 A | 8/1990 | Haastert | 340/784 |
| 4,954,789 A | 9/1990 | Sampsell | 330/4.3 |
| 4,956,619 A | 9/1990 | Hornbeck | 330/4.6 |
| 4,961,633 A | 10/1990 | Ibrahim et al. | 350/392 |
| 4,963,012 A | 10/1990 | Tracy et al. | 350/641 |
| 4,970,575 A | 11/1990 | Soga et al. | 357/72 |
| 4,978,202 A | 12/1990 | Yang | 350/331 R |
| 4,982,184 A | 1/1991 | Kirkwood | 340/783 |
| 4,982,265 A | 1/1991 | Watanabe et al. | 357/75 |
| 4,984,824 A | 1/1991 | Antes et al. | 283/91 |
| 4,999,308 A | 3/1991 | Nishiura et al. | 437/4 |
| 5,003,300 A | 3/1991 | Wells | 340/705 |
| 5,009,473 A | 4/1991 | Hunter et al. | 350/6.6 |
| 5,013,141 A | 5/1991 | Sakata | 350/348 |
| 5,018,256 A | 5/1991 | Hornbeck | 29/25.01 |
| 5,022,750 A | 6/1991 | Flasck | 353/31 |
| 5,023,905 A | 6/1991 | Wells et al. | 379/96 |
| 5,024,494 A | 6/1991 | Williams et al. | 350/3.6 |
| 5,028,939 A | 7/1991 | Hornbeck et al. | 346/160 |
| 5,031,144 A | 7/1991 | Persky | |
| 5,035,473 A | 7/1991 | Kuwayama et al. | 350/3.7 |
| 5,037,173 A | 8/1991 | Sampsell et al. | 385/17 |
| 5,039,628 A | 8/1991 | Carey | 437/183 |
| 5,040,052 A | 8/1991 | McDavid | 357/80 |
| 5,041,395 A | 8/1991 | Steffen | 437/206 |
| 5,041,851 A | 8/1991 | Nelson | 346/160 |
| 5,043,917 A | 8/1991 | Okamoto | 364/518 |
| 5,048,077 A | 9/1991 | Wells et al. | 379/96 |
| 5,049,901 A | 9/1991 | Gelbart | 346/108 |
| 5,058,992 A | 10/1991 | Takahashi | 359/567 |
| 5,060,058 A | 10/1991 | Goldenberg et al. | 358/60 |
| 5,061,049 A | 10/1991 | Hornbéck | 359/224 |
| 5,066,614 A | 11/1991 | Dunnaway et al. | 437/209 |
| 5,068,205 A | 11/1991 | Baxter et al. | 437/205 |
| 5,072,239 A | 12/1991 | Mitcham et al. | 346/108 |
| 5,072,418 A | 12/1991 | Boutaud et al. | 364/715.06 |
| 5,074,947 A | 12/1991 | Estes et al. | 156/307.3 |
| 5,075,940 A | 12/1991 | Kuriyama et al. | 29/25.03 |
| 5,079,544 A | 1/1992 | DeMond et al. | 340/701 |
| 5,081,617 A | 1/1992 | Gelbart | 369/112 |
| 5,083,857 A | 1/1992 | Hornbeck | 359/291 |
| 5,085,497 A | 2/1992 | Um et al. | 359/848 |
| 5,089,903 A | 2/1992 | Kuwayama et al. | 359/15 |
| 5,093,281 A | 3/1992 | Eshima | 437/217 |
| 5,096,279 A | 3/1992 | Hornbeck et al. | 359/230 |
| 5,099,353 A | 3/1992 | Hornbeck | 359/291 |
| 5,101,184 A | 3/1992 | Antes | 235/454 |
| 5,101,236 A | 3/1992 | Nelson et al. | 355/229 |
| 5,103,334 A | 4/1992 | Swanberg | 359/197 |
| 5,105,207 A | 4/1992 | Nelson | 346/160 |
| 5,105,299 A | 4/1992 | Anderson et al. | 359/223 |
| 5,105,369 A | 4/1992 | Nelson | 364/525 |
| 5,107,372 A | 4/1992 | Gelbart et al. | 359/824 |
| 5,112,436 A | 5/1992 | Bol | 156/643 |
| 5,113,272 A | 5/1992 | Reamey | 359/53 |
| 5,113,285 A | 5/1992 | Franklin et al. | 359/465 |
| 5,115,344 A | 5/1992 | Jaskie | 359/573 |
| 5,119,204 A | 6/1992 | Hashimoto et al. | 358/254 |
| 5,121,343 A | 6/1992 | Faris | 395/111 |
| 5,126,812 A | 6/1992 | Greiff | 357/25 |
| 5,126,826 A | 6/1992 | Kauchi et al. | 357/72 |
| 5,126,836 A | 6/1992 | Um | 358/60 |
| 5,128,660 A | 7/1992 | DeMond et al. | 340/707 |
| 5,129,716 A | 7/1992 | Holakovszky et al. | 351/50 |
| 5,132,723 A | 7/1992 | Gelbart | 355/40 |
| 5,132,812 A | 7/1992 | Takahashi et al. | 359/9 |
| 5,136,695 A | 8/1992 | Goldshlag et al. | 395/275 |
| 5,137,836 A | 8/1992 | Lam | 437/8 |
| 5,142,303 A | 8/1992 | Nelson | 346/108 |
| 5,142,405 A | 8/1992 | Hornbeck | 359/226 |
| 5,142,677 A | 8/1992 | Ehlig et al. | 395/650 |
| 5,144,472 A | 9/1992 | Sang, Jr. et al. | 359/254 |
| 5,147,815 A | 9/1992 | Casto | 437/51 |
| 5,148,157 A | 9/1992 | Florence | 340/783 |
| 5,148,506 A | 9/1992 | McDonald | 385/16 |
| 5,149,405 A | 9/1992 | Bruns et al. | 204/129.1 |
| 5,150,205 A | 9/1992 | Um et al. | 358/60 |
| 5,151,718 A | 9/1992 | Nelson | 346/160 |
| 5,151,724 A | 9/1992 | Kikinis | 357/17 |
| 5,151,763 A | 9/1992 | Marek et al. | 357/26 |
| 5,153,770 A | 10/1992 | Harris | 359/245 |
| 5,155,604 A | 10/1992 | Miekka et al. | 359/2 |
| 5,155,615 A | 10/1992 | Tagawa | 359/213 |
| 5,155,778 A | 10/1992 | Magel et al. | 385/18 |
| 5,155,812 A | 10/1992 | Ehlig et al. | 395/275 |
| 5,157,304 A | 10/1992 | Kane et al. | 313/495 |
| 5,159,485 A | 10/1992 | Nelson | 359/291 |
| 5,161,042 A | 11/1992 | Hamada | 359/41 |
| 5,162,787 A | 11/1992 | Thompson et al. | 340/794 |
| 5,164,019 A | 11/1992 | Sinton | 136/249 |
| 5,165,013 A | 11/1992 | Faris | 395/104 |
| 5,168,401 A | 12/1992 | Endriz | 359/625 |
| 5,168,406 A | 12/1992 | Nelson | 359/855 |
| 5,170,156 A | 12/1992 | DeMond et al. | 340/794 |
| 5,170,269 A | 12/1992 | Lin et al. | 359/9 |
| 5,170,283 A | 12/1992 | O'Brien et al. | 359/291 |
| 5,172,161 A | 12/1992 | Nelson | 355/200 |
| 5,172,262 A | 12/1992 | Hornbeck | 359/223 |
| 5,177,724 A | 1/1993 | Gelbart | 369/44.16 |
| 5,178,728 A | 1/1993 | Boysel et al. | 156/656 |
| 5,179,274 A | 1/1993 | Sampsell | 250/208.2 |
| 5,179,367 A | 1/1993 | Shimizu | 340/700 |
| 5,181,231 A | 1/1993 | Parikh et al. | 377/26 |
| 5,182,665 A | 1/1993 | O'Callaghan et al. | 359/95 |
| 5,185,660 A | 2/1993 | Um | 358/60 |
| 5,185,823 A | 2/1993 | Kaku et al. | |
| 5,188,280 A | 2/1993 | Nakao et al. | 228/123 |
| 5,189,404 A | 2/1993 | Masimo et al. | 340/720 |
| 5,189,505 A | 2/1993 | Bartelink | 257/419 |
| 5,191,405 A | 3/1993 | Tomita et al. | 257/777 |
| 5,192,864 A | 3/1993 | McEwen et al. | 250/234 |
| 5,192,946 A | 3/1993 | Thompson et al. | 340/794 |
| 5,198,895 A | 3/1993 | Vick | 358/103 |
| 5,202,785 A | 4/1993 | Nelson | 359/214 |
| 5,206,629 A | 4/1993 | DeMond et al. | 340/719 |
| 5,206,829 A | 4/1993 | Thakoor et al. | |
| 5,208,818 A | 5/1993 | Gelbart et al. | 372/30 |
| 5,208,891 A | 5/1993 | Prysner | 385/116 |
| 5,210,637 A | 5/1993 | Puzey | 359/263 |
| 5,212,115 A | 5/1993 | Cho et al. | 437/208 |
| 5,212,555 A | 5/1993 | Stoltz | 358/206 |
| 5,212,582 A | 5/1993 | Nelson | 359/224 |
| 5,214,308 A | 5/1993 | Nishiquchi et al. | 257/692 |
| 5,214,419 A | 5/1993 | DeMond et al. | 340/794 |
| 5,214,420 A | 5/1993 | Thompson et al. | 340/795 |
| 5,216,278 A | 6/1993 | Lin et al. | |
| 5,216,537 A | 6/1993 | Hornbeck | 359/291 |
| 5,216,544 A | 6/1993 | Horikawa et al. | 359/622 |
| 5,219,794 A | 6/1993 | Satoh et al. | 437/209 |
| 5,220,200 A | 6/1993 | Blanton | 257/778 |
| 5,221,400 A | 6/1993 | Staller et al. | 156/292 |
| 5,221,982 A | 6/1993 | Faris | 359/93 |
| 5,224,088 A | 6/1993 | Atiya | 369/97 |
| 5,226,099 A | 7/1993 | Mignardi et al. | 385/19 |
| 5,229,597 A | 7/1993 | Fukatsu | |

| | | | |
|---|---|---|---|
| 5,230,005 A | 7/1993 | Rubino et al. ............... 372/20 |
| 5,231,363 A | 7/1993 | Sano et al. ............... 332/109 |
| 5,231,388 A | 7/1993 | Stoltz ............... 340/783 |
| 5,231,432 A | 7/1993 | Glenn ............... 353/31 |
| 5,233,456 A | 8/1993 | Nelson ............... 359/214 |
| 5,233,460 A | 8/1993 | Partlo et al. ............... 359/247 |
| 5,233,874 A | 8/1993 | Putty et al. ............... 73/517 AV |
| 5,237,340 A | 8/1993 | Nelson ............... 346/108 |
| 5,237,435 A | 8/1993 | Kurematsu et al. ............... 359/41 |
| 5,239,448 A | 8/1993 | Perkins et al. ............... 361/764 |
| 5,239,806 A | 8/1993 | Maslakow ............... 53/432 |
| 5,240,818 A | 8/1993 | Mignardi et al. ............... 430/321 |
| 5,245,686 A | 9/1993 | Faris et al. ............... 385/120 |
| 5,247,180 A | 9/1993 | Mitcham et al. ............... 250/492.1 |
| 5,247,593 A | 9/1993 | Lin et al. ............... 385/17 |
| 5,249,245 A | 9/1993 | Lebby et al. ............... 385/89 |
| 5,251,057 A | 10/1993 | Guerin et al. ............... 359/249 |
| 5,251,058 A | 10/1993 | MacArthur ............... 359/249 |
| 5,254,980 A | 10/1993 | Hendrix et al. ............... 345/84 |
| 5,255,100 A | 10/1993 | Urbanus ............... 358/231 |
| 5,256,869 A | 10/1993 | Lin et al. ............... 250/201.9 |
| 5,258,325 A | 11/1993 | Spitzer et al. ............... 437/86 |
| 5,260,718 A | 11/1993 | Rommelmann et al. 346/107 R |
| 5,260,798 A | 11/1993 | Um et al. ............... 358/233 |
| 5,262,000 A | 11/1993 | Welbourn et al. ............... 156/643 |
| 5,272,473 A | 12/1993 | Thompson et al. ............... 345/7 |
| 5,278,652 A | 1/1994 | Urbanus et al. ............... 358/160 |
| 5,278,925 A | 1/1994 | Boysel et al. ............... 385/14 |
| 5,280,277 A | 1/1994 | Hornbeck ............... 345/108 |
| 5,281,887 A | 1/1994 | Engle ............... 310/335 |
| 5,281,957 A | 1/1994 | Schoolman ............... 345/8 |
| 5,285,105 A | 2/1994 | Cain ............... 257/672 |
| 5,285,196 A | 2/1994 | Gale, Jr. ............... 345/108 |
| 5,285,407 A | 2/1994 | Gale et al. ............... 365/189.11 |
| 5,287,096 A | 2/1994 | Thompson et al. ............... 345/147 |
| 5,287,215 A | 2/1994 | Warde et al. ............... 359/293 |
| 5,289,172 A | 2/1994 | Gale, Jr. et al. ............... 345/108 |
| 5,291,317 A | 3/1994 | Newswanger ............... 359/15 |
| 5,291,473 A | 3/1994 | Pauli ............... 369/112 |
| 5,293,511 A | 3/1994 | Poradish et al. ............... 257/434 |
| 5,296,408 A | 3/1994 | Wilbarg et al. ............... 437/203 |
| 5,296,891 A | 3/1994 | Vogt et al. ............... 355/67 |
| 5,296,950 A | 3/1994 | Lin et al. ............... 359/9 |
| 5,298,460 A | 3/1994 | Nishiguchi et al. ............... 437/183 |
| 5,299,037 A | 3/1994 | Sakata ............... 359/41 |
| 5,299,289 A | 3/1994 | Omae et al. ............... 359/95 |
| 5,300,813 A | 4/1994 | Joshi et al. ............... 257/752 |
| 5,301,062 A | 4/1994 | Takahashi et al. ............... 359/567 |
| 5,303,043 A | 4/1994 | Glenn ............... 348/40 |
| 5,303,055 A | 4/1994 | Hendrix et al. ............... 348/761 |
| 5,307,056 A | 4/1994 | Urbanus ............... 340/719 |
| 5,307,185 A | 4/1994 | Jones et al. ............... 359/41 |
| 5,310,624 A | 5/1994 | Ehrlich ............... 430/322 |
| 5,311,349 A | 5/1994 | Anderson et al. ............... 359/223 |
| 5,311,360 A | 5/1994 | Bloom et al. ............... 359/572 |
| 5,312,513 A | 5/1994 | Florence et al. ............... 156/643 |
| 5,313,479 A * | 5/1994 | Florence ............... 372/26 |
| 5,313,648 A | 5/1994 | Ehlig et al. ............... 395/800 |
| 5,313,835 A | 5/1994 | Dunn ............... 73/505 |
| 5,315,418 A | 5/1994 | Sprague et al. ............... 359/41 |
| 5,315,423 A | 5/1994 | Hong ............... 359/124 |
| 5,315,429 A | 5/1994 | Abramov |
| 5,319,214 A | 6/1994 | Gregory et al. ............... 250/504 R |
| 5,319,668 A | 6/1994 | Luecke ............... 372/107 |
| 5,319,789 A | 6/1994 | Ehlig et al. ............... 395/800 |
| 5,319,792 A | 6/1994 | Ehlig et al. ............... 395/800 |
| 5,320,709 A | 6/1994 | Bowden et al. |
| 5,321,416 A | 6/1994 | Bassett et al. ............... 345/8 |
| 5,323,002 A | 6/1994 | Sampsell et al. ............... 250/252.1 |
| 5,323,051 A | 6/1994 | Adams et al. ............... 257/417 |
| 5,325,116 A | 6/1994 | Sampsell ............... 346/108 |
| 5,327,286 A | 7/1994 | Sampsell et al. ............... 359/561 |
| 5,329,289 A | 7/1994 | Sakamoto et al. ............... 345/126 |
| 5,330,301 A | 7/1994 | Brancher ............... 414/417 |
| 5,330,878 A | 7/1994 | Nelson ............... 430/311 |
| 5,331,454 A | 7/1994 | Hornbeck ............... 359/224 |
| 5,334,991 A | 8/1994 | Wells et al. ............... 345/8 |
| 5,339,116 A | 8/1994 | Urbanus et al. ............... 348/716 |
| 5,339,177 A | 8/1994 | Jenkins et al. ............... 359/35 |
| 5,340,772 A | 8/1994 | Rosotker ............... 437/226 |
| 5,345,521 A | 9/1994 | McDonald et al. ............... 385/19 |
| 5,347,321 A | 9/1994 | Gove ............... 348/663 |
| 5,347,378 A | 9/1994 | Handschy et al. ............... 359/53 |
| 5,347,433 A | 9/1994 | Sedlmayr ............... 362/32 |
| 5,348,619 A | 9/1994 | Bohannon et al. ............... 156/664 |
| 5,349,687 A | 9/1994 | Ehlig et al. ............... 395/800 |
| 5,351,052 A | 9/1994 | D'Hont et al. ............... 342/42 |
| 5,352,926 A | 10/1994 | Andrews ............... 257/717 |
| 5,354,416 A | 10/1994 | Okudaira et al. ............... 156/643 |
| 5,357,369 A | 10/1994 | Pilling et al. ............... 359/462 |
| 5,357,803 A | 10/1994 | Lane ............... 73/517 B |
| 5,359,349 A | 10/1994 | Jambor et al. ............... 345/168 |
| 5,359,451 A | 10/1994 | Gelbart et al. ............... 359/285 |
| 5,361,131 A | 11/1994 | Tekemori et al. ............... 356/355 |
| 5,363,220 A | 11/1994 | Kuwayama et al. ............... 359/3 |
| 5,365,283 A | 11/1994 | Doherty et al. ............... 348/743 |
| 5,367,585 A | 11/1994 | Ghezzo et al. ............... 385/23 |
| 5,371,543 A | 12/1994 | Anderson ............... 348/270 |
| 5,371,618 A | 12/1994 | Tai et al. ............... 359/53 |
| 5,382,961 A | 1/1995 | Gale, Jr. ............... 345/108 |
| 5,387,924 A | 2/1995 | Gale, Jr. et al. ............... 345/108 |
| 5,389,182 A | 2/1995 | Mignardi ............... 156/344 |
| 5,391,881 A | 2/1995 | Jeuch et al. ............... 250/370.09 |
| 5,392,140 A | 2/1995 | Ezra et al. ............... 359/41 |
| 5,392,151 A | 2/1995 | Nelson ............... 359/223 |
| 5,394,303 A | 2/1995 | Yamaji ............... 361/749 |
| 5,398,071 A | 3/1995 | Gove et al. ............... 348/558 |
| 5,399,898 A | 3/1995 | Rostoker ............... 257/499 |
| 5,404,365 A * | 4/1995 | Hiiro ............... 372/27 |
| 5,404,485 A | 4/1995 | Ban ............... 395/425 |
| 5,408,123 A | 4/1995 | Murai ............... 257/531 |
| 5,410,315 A | 4/1995 | Huber ............... 342/42 |
| 5,411,769 A | 5/1995 | Hornbeck ............... 427/534 |
| 5,412,186 A | 5/1995 | Gale ............... 219/679 |
| 5,412,501 A | 5/1995 | Fisli ............... 359/286 |
| 5,418,584 A | 5/1995 | Larson ............... 353/122 |
| 5,420,655 A | 5/1995 | Shimizu ............... 353/33 |
| 5,420,722 A | 5/1995 | Bielak ............... 359/708 |
| 5,426,072 A | 6/1995 | Finnila ............... 437/208 |
| 5,427,975 A | 6/1995 | Sparks et al. ............... 437/79 |
| 5,430,524 A | 7/1995 | Nelson ............... 355/200 |
| 5,435,876 A | 7/1995 | Alfaro et al. ............... 156/247 |
| 5,438,477 A | 8/1995 | Pasch ............... 361/689 |
| 5,439,731 A | 8/1995 | Li et al. ............... 428/209 |
| 5,442,411 A | 8/1995 | Urbanus et al. ............... 348/771 |
| 5,442,414 A | 8/1995 | Janssen et al. ............... 353/98 |
| 5,444,566 A | 8/1995 | Gale et al. ............... 359/291 |
| 5,445,559 A | 8/1995 | Gale et al. ............... 451/388 |
| 5,446,479 A | 8/1995 | Thompson et al. ............... 345/139 |
| 5,447,600 A | 9/1995 | Webb ............... 216/2 |
| 5,448,314 A | 9/1995 | Heimbuch et al. ............... 348/743 |
| 5,448,546 A | 9/1995 | Pauli ............... 369/112 |
| 5,450,088 A | 9/1995 | Meier et al. ............... 342/51 |
| 5,450,219 A | 9/1995 | Gold et al. ............... 359/40 |
| 5,451,103 A | 9/1995 | Hatanaka et al. ............... 353/31 |
| 5,452,024 A | 9/1995 | Sampsell ............... 348/755 |
| 5,452,138 A | 9/1995 | Mignardi et al. ............... 359/855 |
| 5,453,747 A | 9/1995 | D'Hont et al. ............... 342/42 |
| 5,453,778 A | 9/1995 | Venkateswar et al. ............... 347/239 |
| 5,453,803 A | 9/1995 | Shapiro et al. ............... 353/119 |
| 5,454,160 A | 10/1995 | Nickel ............... 29/840 |
| 5,454,906 A | 10/1995 | Baker et al. ............... 216/66 |
| 5,455,445 A | 10/1995 | Kurtz et al. ............... 257/419 |
| 5,455,455 A | 10/1995 | Badehi ............... 257/690 |
| 5,455,602 A | 10/1995 | Tew ............... 347/239 |
| 5,457,493 A | 10/1995 | Leddy et al. ............... 348/164 |

| | | | |
|---|---|---|---|
| 5,457,566 A | 10/1995 | Sampsell et al. ............ 359/292 |
| 5,457,567 A | 10/1995 | Shinohara ................... 359/305 |
| 5,458,716 A | 10/1995 | Alfaro et al. ................ 156/245 |
| 5,459,492 A | 10/1995 | Venkateswar ............... 347/253 |
| 5,459,528 A | 10/1995 | Pettitt ......................... 348/568 |
| 5,459,592 A | 10/1995 | Shibatani et al. ............. 359/40 |
| 5,459,610 A | 10/1995 | Bloom et al. ................ 359/572 |
| 5,461,197 A | 10/1995 | Hiruta et al. ............... 174/52.4 |
| 5,461,410 A | 10/1995 | Venkateswar et al. ...... 347/240 |
| 5,461,411 A | 10/1995 | Florence et al. ............ 347/240 |
| 5,461,547 A | 10/1995 | Ciupke et al. ................. 362/21 |
| 5,463,347 A | 10/1995 | Jones et al. ................. 330/253 |
| 5,463,497 A | 10/1995 | Muraki et al. .............. 359/618 |
| 5,465,175 A | 11/1995 | Woodgate et al. .......... 359/463 |
| 5,467,106 A | 11/1995 | Salomon ....................... 345/87 |
| 5,467,138 A | 11/1995 | Gove ........................... 348/452 |
| 5,467,146 A | 11/1995 | Huang et al. ................ 348/743 |
| 5,469,302 A | 11/1995 | Lim ............................. 359/846 |
| 5,471,341 A | 11/1995 | Warde et al. ................ 359/293 |
| 5,473,512 A | 12/1995 | Degani et al. ............... 361/760 |
| 5,475,236 A | 12/1995 | Yoshizaki ...................... 257/48 |
| 5,480,839 A | 1/1996 | Ezawa et al. ................ 437/209 |
| 5,481,118 A | 1/1996 | Tew ............................. 250/551 |
| 5,481,133 A | 1/1996 | Hsu .............................. 257/621 |
| 5,482,564 A | 1/1996 | Douglas et al. ................ 134/18 |
| 5,482,818 A | 1/1996 | Nelson ......................... 430/394 |
| 5,483,307 A | 1/1996 | Anderson ...................... 353/98 |
| 5,485,172 A | 1/1996 | Sawachika et al. ............. 345/8 |
| 5,485,304 A | 1/1996 | Kaeriyama .................. 359/291 |
| 5,485,354 A | 1/1996 | Ciupke et al. ................. 362/31 |
| 5,486,698 A | 1/1996 | Hanson et al. .............. 250/332 |
| 5,486,841 A | 1/1996 | Hara et al. ...................... 345/8 |
| 5,486,884 A * | 1/1996 | De Vaan ..................... 353/122 |
| 5,486,946 A | 1/1996 | Jachimowicz et al. ...... 359/263 |
| 5,488,431 A | 1/1996 | Gove et al. .................. 348/716 |
| 5,489,952 A | 2/1996 | Gove et al. .................. 348/771 |
| 5,490,009 A | 2/1996 | Venkateswar et al. ...... 359/291 |
| 5,491,510 A | 2/1996 | Gove ............................. 348/77 |
| 5,491,612 A | 2/1996 | Nicewarner, Jr. ........... 361/760 |
| 5,491,715 A | 2/1996 | Flaxl ............................ 375/344 |
| 5,493,177 A | 2/1996 | Muller et al. ................ 313/578 |
| 5,493,439 A | 2/1996 | Engle ........................... 359/292 |
| 5,497,172 A | 3/1996 | Doherty et al. ............... 345/85 |
| 5,497,197 A | 3/1996 | Gove et al. .................. 348/388 |
| 5,497,262 A | 3/1996 | Kaeriyama .................. 359/223 |
| 5,499,060 A | 3/1996 | Gove et al. .................. 348/651 |
| 5,499,062 A | 3/1996 | Urbanus ....................... 348/771 |
| 5,500,761 A | 3/1996 | Goossen et al. ............. 359/290 |
| 5,502,481 A | 3/1996 | Dentinger et al. ............ 348/51 |
| 5,504,504 A | 4/1996 | Markandey et al. ........ 345/214 |
| 5,504,514 A | 4/1996 | Nelson ......................... 347/130 |
| 5,504,575 A | 4/1996 | Stafford ....................... 356/330 |
| 5,504,614 A | 4/1996 | Webb et al. ................. 359/223 |
| 5,506,171 A | 4/1996 | Leonard et al. ............. 437/187 |
| 5,506,597 A | 4/1996 | Thompson et al. ........... 345/85 |
| 5,506,720 A | 4/1996 | Yoon ............................ 359/224 |
| 5,508,558 A | 4/1996 | Robinette, Jr. et al. ..... 257/700 |
| 5,508,561 A | 4/1996 | Tago et al. ................... 257/737 |
| 5,508,565 A | 4/1996 | Hatakeyama et al. ....... 257/777 |
| 5,508,750 A | 4/1996 | Hewlett et al. .............. 348/558 |
| 5,508,840 A | 4/1996 | Vogel et al. ................. 359/291 |
| 5,508,841 A | 4/1996 | Lin et al. ..................... 359/318 |
| 5,510,758 A | 4/1996 | Fujita et al. ................. 333/247 |
| 5,510,824 A | 4/1996 | Nelson ......................... 347/239 |
| 5,512,374 A | 4/1996 | Wallace et al. .............. 428/422 |
| 5,512,748 A | 4/1996 | Hanson ........................ 250/332 |
| 5,515,076 A | 5/1996 | Thompson et al. .......... 345/139 |
| 5,516,125 A | 5/1996 | McKenna ....................... 279/3 |
| 5,517,340 A | 5/1996 | Doany et al. .................. 359/41 |
| 5,517,347 A | 5/1996 | Sampsell ..................... 359/224 |
| 5,517,357 A | 5/1996 | Shibayama .................. 359/547 |
| 5,517,359 A | 5/1996 | Gelbart ........................ 359/623 |
| 5,519,251 A | 5/1996 | Sato et al. .................... 257/666 |
| 5,519,450 A | 5/1996 | Urbanus et al. ............. 348/600 |
| 5,521,748 A | 5/1996 | Sarraf ........................... 359/321 |
| 5,523,619 A | 6/1996 | McAllister et al. .......... 257/686 |
| 5,523,628 A | 6/1996 | Williams et al. ............. 257/777 |
| 5,523,803 A | 6/1996 | Urbanus et al. ............. 348/771 |
| 5,523,878 A | 6/1996 | Wallace et al. .............. 359/290 |
| 5,523,881 A | 6/1996 | Florence et al. ............. 359/561 |
| 5,523,920 A | 6/1996 | Machuga et al. ............ 361/767 |
| 5,524,155 A | 6/1996 | Weaver ......................... 385/24 |
| 5,534,107 A | 7/1996 | Gray et al. ............... 156/643.1 |
| 5,534,386 A | 7/1996 | Petersen et al. ............. 430/320 |
| 5,534,883 A | 7/1996 | Koh ................................ 345/3 |
| 5,539,422 A | 7/1996 | Heacock et al. ................ 345/8 |
| 5,544,306 A | 8/1996 | Deering et al. ............. 395/164 |
| 5,552,635 A | 9/1996 | Kim et al. |
| 5,554,304 A | 9/1996 | Suzuki ........................... 216/2 |
| 5,576,878 A | 11/1996 | Henck ........................... 359/224 |
| 5,602,671 A | 2/1997 | Hornbeck .................... 359/224 |
| 5,606,181 A | 2/1997 | Sakuma et al. ................ 257/88 |
| 5,606,447 A | 2/1997 | Asada et al. ................. 359/199 |
| 5,610,438 A | 3/1997 | Wallace et al. .............. 257/682 |
| 5,623,361 A | 4/1997 | Engle ........................... 359/291 |
| 5,629,566 A | 5/1997 | Doi et al. ..................... 257/789 |
| 5,629,801 A | 5/1997 | Staker et al. ................. 359/572 |
| 5,640,216 A | 6/1997 | Hasegawa et al. ............ 349/58 |
| 5,658,698 A | 8/1997 | Yagi et al. ..................... 430/11 |
| 5,661,592 A | 8/1997 | Bornstein et al. ............ 359/291 |
| 5,661,593 A | 8/1997 | Engle ........................... 359/292 |
| 5,663,817 A | 9/1997 | Frapin et al. ................... 349/5 |
| 5,668,611 A | 9/1997 | Ernstoff et al. .............. 348/771 |
| 5,673,139 A | 9/1997 | Johnson ....................... 359/291 |
| 5,677,783 A | 10/1997 | Bloom et al. ................ 359/224 |
| 5,689,361 A | 11/1997 | Damen et al. ............... 359/284 |
| 5,691,836 A | 11/1997 | Clark ........................... 359/247 |
| 5,694,740 A | 12/1997 | Martin et al. .................. 53/431 |
| 5,696,560 A | 12/1997 | Songer ......................... 348/436 |
| 5,699,740 A | 12/1997 | Gelbart ........................ 101/477 |
| 5,704,700 A | 1/1998 | Kappel et al. ................. 353/31 |
| 5,707,160 A | 1/1998 | Bowen ......................... 400/472 |
| 5,712,649 A | 1/1998 | Tosaki ............................ 345/8 |
| 5,713,652 A | 2/1998 | Zavracky et al. ............ 353/122 |
| 5,726,480 A | 3/1998 | Pister .......................... 257/415 |
| 5,731,802 A | 3/1998 | Aras et al. ................... 345/148 |
| 5,734,224 A | 3/1998 | Tagawa et al. ............... 313/493 |
| 5,742,373 A | 4/1998 | Alvelda ........................ 349/204 |
| 5,744,752 A | 4/1998 | McHerron et al. ......... 174/52.4 |
| 5,745,271 A | 4/1998 | Ford et al. ................... 359/130 |
| 5,757,354 A | 5/1998 | Kawamura ................... 345/126 |
| 5,757,536 A | 5/1998 | Ricco et al. ................. 359/224 |
| 5,764,280 A | 6/1998 | Bloom et al. .................. 348/53 |
| 5,768,009 A | 6/1998 | Little ........................... 359/293 |
| 5,770,473 A | 6/1998 | Hall et al. ...................... 438/26 |
| 5,793,519 A | 8/1998 | Furlani et al. ............... 359/291 |
| 5,798,743 A | 8/1998 | Bloom ........................... 345/90 |
| 5,798,805 A | 8/1998 | Ooi et al. ...................... 349/10 |
| 5,801,074 A | 9/1998 | Kim et al. ................... 438/125 |
| 5,802,222 A | 9/1998 | Rasch et al. ................... 385/1 |
| 5,808,323 A | 9/1998 | Spaeth et al. .................. 257/88 |
| 5,808,797 A | 9/1998 | Bloom et al. ................ 359/572 |
| 5,815,126 A | 9/1998 | Fan et al. ........................ 345/8 |
| 5,825,443 A | 10/1998 | Kawasaki et al. ............. 349/95 |
| 5,832,148 A | 11/1998 | Yariv |
| 5,835,255 A | 11/1998 | Miles ........................... 359/291 |
| 5,835,256 A | 11/1998 | Huibers ....................... 359/291 |
| 5,837,562 A | 11/1998 | Cho ............................... 438/51 |
| 5,841,579 A | 11/1998 | Bloom et al. ................ 359/572 |
| 5,841,929 A | 11/1998 | Komatsu et al. |
| 5,844,711 A | 12/1998 | Long, Jr. ..................... 359/291 |
| 5,847,859 A | 12/1998 | Murata ........................ 359/201 |
| 5,862,164 A * | 1/1999 | Hill ............................... 372/27 |
| 5,868,854 A | 2/1999 | Kojima et al. ............... 134/1.3 |
| 5,886,675 A | 3/1999 | Aye et al. ....................... 345/7 |
| 5,892,505 A | 4/1999 | Tropper ....................... 345/208 |

| | | | |
|---|---|---|---|
| 5,895,233 A | 4/1999 | Higashi et al. | 438/107 |
| 5,898,515 A | 4/1999 | Furlani et al. | 359/290 |
| 5,903,243 A | 5/1999 | Jones | 345/7 |
| 5,903,395 A | 5/1999 | Rallison et al. | 359/630 |
| 5,910,856 A | 6/1999 | Ghosh et al. | 359/291 |
| 5,912,094 A | 6/1999 | Aksyuk et al. | 430/5 |
| 5,912,608 A | 6/1999 | Asada | 335/222 |
| 5,914,801 A | 6/1999 | Dhuler et al. | 359/230 |
| 5,915,168 A | 6/1999 | Salatino et al. | 438/110 |
| 5,919,548 A | 7/1999 | Barron et al. | 428/138 |
| 5,920,411 A | 7/1999 | Duck et al. | 359/127 |
| 5,920,418 A | 7/1999 | Shiono et al. | 359/246 |
| 5,923,475 A | 7/1999 | Kurtz et al. | 359/619 |
| 5,926,309 A | 7/1999 | Little | 359/293 |
| 5,926,318 A | 7/1999 | Hebert | 359/618 |
| 5,942,791 A | 8/1999 | Shorrocks et al. | 257/522 |
| 5,949,390 A | 9/1999 | Nomura et al. | 345/32 |
| 5,949,570 A | 9/1999 | Shiono et al. | 359/291 |
| 5,953,161 A | 9/1999 | Troxell et al. | 359/618 |
| 5,955,771 A | 9/1999 | Kurtz et al. | 257/419 |
| 5,963,788 A | 10/1999 | Barron et al. | 438/48 |
| 5,978,127 A | 11/1999 | Berg | 359/279 |
| 5,982,553 A | 11/1999 | Bloom et al. | 359/627 |
| 5,986,634 A | 11/1999 | Alioshin et al. | 345/126 |
| 5,986,796 A | 11/1999 | Miles | 359/260 |
| 5,995,303 A | 11/1999 | Honguh et al. | 359/708 |
| 5,999,319 A | 12/1999 | Castracane | 359/573 |
| 6,004,912 A | 12/1999 | Gudeman | 508/577 |
| 6,012,336 A | 1/2000 | Eaton et al. | |
| 6,016,222 A | 1/2000 | Setani et al. | 359/571 |
| 6,025,859 A | 2/2000 | Ide et al. | 347/135 |
| 6,038,057 A | 3/2000 | Brazas, Jr. et al. | 359/291 |
| 6,040,748 A | 3/2000 | Gueissaz | 335/78 |
| 6,046,840 A | 4/2000 | Huibers | 359/291 |
| 6,055,090 A | 4/2000 | Miles | 359/291 |
| 6,057,520 A | 5/2000 | Goodwin-Johansson | 200/181 |
| 6,061,166 A | 5/2000 | Furlani et al. | 359/254 |
| 6,061,489 A | 5/2000 | Ezra | 385/115 |
| 6,062,461 A | 5/2000 | Sparks et al. | 228/123.1 |
| 6,064,404 A | 5/2000 | Aras et al. | 345/507 |
| 6,069,392 A | 5/2000 | Tai et al. | 257/419 |
| 6,071,652 A | 6/2000 | Feldman et al. | 430/5 |
| 6,075,632 A | 6/2000 | Braun | 359/124 |
| 6,084,626 A | 7/2000 | Ramanujan et al. | 347/239 |
| 6,088,102 A | 7/2000 | Manhart | 356/354 |
| 6,090,717 A | 7/2000 | Powell et al. | 438/710 |
| 6,091,521 A | 7/2000 | Popovich | 359/15 |
| 6,096,576 A | 8/2000 | Corbin et al. | 438/108 |
| 6,096,656 A | 8/2000 | Matzke et al. | |
| 6,097,352 A | 8/2000 | Zavracky et al. | 345/7 |
| 6,101,036 A | 8/2000 | Bloom | 359/567 |
| 6,115,168 A | 9/2000 | Zhao et al. | 359/247 |
| 6,122,299 A | 9/2000 | DeMars et al. | 372/20 |
| 6,123,985 A | 9/2000 | Robinson et al. | 427/162 |
| 6,124,145 A | 9/2000 | Stemme et al. | 438/26 |
| 6,130,770 A | 10/2000 | Bloom | 359/224 |
| 6,144,481 A | 11/2000 | Kowarz et al. | 359/291 |
| 6,147,789 A | 11/2000 | Gelbart | 359/231 |
| 6,154,259 A | 11/2000 | Hargis et al. | 348/756 |
| 6,154,305 A | 11/2000 | Dickensheets et al. | |
| 6,163,026 A | 12/2000 | Bawolek et al. | 250/351 |
| 6,163,402 A * | 12/2000 | Chou et al. | 359/443 |
| 6,169,624 B1 | 1/2001 | Godil et al. | 359/237 |
| 6,172,796 B1 | 1/2001 | Kowarz et al. | 359/290 |
| 6,172,797 B1 | 1/2001 | Huibers | 359/291 |
| 6,177,980 B1 | 1/2001 | Johnson | 355/67 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,197,610 B1 | 3/2001 | Toda | 438/50 |
| 6,210,988 B1 | 4/2001 | Howe et al. | 438/50 |
| 6,215,579 B1 | 4/2001 | Bloom et al. | 359/298 |
| 6,219,015 B1 | 4/2001 | Bloom et al. | 345/87 |
| 6,222,954 B1 | 4/2001 | Riza | 385/18 |
| 6,229,650 B1 | 5/2001 | Reznichenko et al. | 359/566 |
| 6,229,683 B1 | 5/2001 | Goodwin-Johansson | 361/233 |
| 6,241,143 B1 | 6/2001 | Kuroda | 228/110.1 |
| 6,249,381 B1 * | 6/2001 | Suganuma | 359/618 |
| 6,251,842 B1 | 6/2001 | Gudeman | 508/577 |
| 6,252,697 B1 | 6/2001 | Hawkins et al. | 359/290 |
| 6,254,792 B1 | 7/2001 | Van Buskirk et al. | 216/13 |
| 6,261,494 B1 | 7/2001 | Zavracky et al. | 264/104 |
| 6,268,952 B1 | 7/2001 | Godil et al. | 359/291 |
| 6,271,145 B1 | 8/2001 | Toda | 438/706 |
| 6,271,808 B1 | 8/2001 | Corbin | 345/7 |
| 6,274,469 B1 | 8/2001 | Yu | 438/592 |
| 6,282,213 B1 | 8/2001 | Gutin et al. | |
| 6,290,859 B1 | 9/2001 | Fleming et al. | 216/2 |
| 6,290,864 B1 | 9/2001 | Patel et al. | 216/79 |
| 6,300,148 B1 | 10/2001 | Birdsley et al. | 438/15 |
| 6,303,986 B1 | 10/2001 | Shook | 257/680 |
| 6,310,018 B1 | 10/2001 | Behr et al. | 510/175 |
| 6,313,901 B1 | 11/2001 | Cacharelis | |
| 6,323,984 B1 | 11/2001 | Trisnadi | 359/245 |
| 6,327,071 B1 | 12/2001 | Kimura | 359/291 |
| 6,342,960 B1 | 1/2002 | McCullough | 359/124 |
| 6,346,430 B1 | 2/2002 | Raj et al. | |
| 6,356,577 B1 | 3/2002 | Miller | 372/107 |
| 6,356,689 B1 | 3/2002 | Greywall | 385/52 |
| 6,359,333 B1 | 3/2002 | Wood et al. | 257/704 |
| 6,384,959 B1 | 5/2002 | Furlani et al. | 359/291 |
| 6,387,723 B1 | 5/2002 | Payne et al. | 438/48 |
| 6,392,309 B1 | 5/2002 | Wataya et al. | 257/796 |
| 6,396,789 B1 | 5/2002 | Guerra et al. | 369/112 |
| 6,418,152 B1 | 7/2002 | Davis | |
| 6,421,179 B1 | 7/2002 | Gutin et al. | 359/752 |
| 6,438,954 B1 | 8/2002 | Goetz et al. | |
| 6,445,502 B1 | 9/2002 | Islam et al. | 359/571 |
| 6,452,260 B1 | 9/2002 | Corbin et al. | 257/686 |
| 6,466,354 B1 | 10/2002 | Gudeman | 359/247 |
| 6,479,811 B1 | 11/2002 | Kruschwitz et al. | |
| 6,480,634 B1 | 11/2002 | Corrigan | 385/4 |
| 6,497,490 B1 | 12/2002 | Miller et al. | 359/614 |
| 6,525,863 B1 | 2/2003 | Riza | 359/290 |
| 6,563,974 B2 | 5/2003 | Riza | 385/18 |
| 6,565,222 B1 | 5/2003 | Ishii et al. | 359/883 |
| 6,569,717 B1 | 5/2003 | Murade | |
| 2001/0019454 A1 * | 9/2001 | Tadic-Galeb et al. | 359/649 |
| 2002/0015230 A1 | 2/2002 | Pilossof et al. | 359/558 |
| 2002/0021485 A1 | 2/2002 | Pilossof | 359/295 |
| 2002/0079432 A1 | 6/2002 | Lee et al. | 250/216 |
| 2002/0105725 A1 | 8/2002 | Sweatt et al. | 359/566 |
| 2002/0112746 A1 | 8/2002 | DeYoung et al. | 134/36 |
| 2002/0131228 A1 | 9/2002 | Potter | |
| 2002/0131230 A1 | 9/2002 | Potter | 361/277 |
| 2002/0135708 A1 | 9/2002 | Murden et al. | |
| 2002/0176151 A1 | 11/2002 | Moon et al. | |
| 2002/0195418 A1 | 12/2002 | Kowarz et al. | |
| 2002/0196492 A1 | 12/2002 | Trisnadi et al. | |
| 2003/0056078 A1 | 3/2003 | Johansson et al. | |

FOREIGN PATENT DOCUMENTS

WO    WO 98/24240    6/1998    H04N 9/31

OTHER PUBLICATIONS

P.C. Kundu et al., "Reduction of Speckle Noise by Varying the Polarisation of Illuminating Beam", XP-002183475, Depart. of Applied Physics, Dec. 30, 1975, pp. 63-67.

Juris Upatnieks, "Improvement of Two-Dimensional Image Quality in Coherent Optical Systems", Applied Optics, Nov. 1967, vol. 6. No. 11, pp. 1905-1910.

T.S. McKechnie, "Speckle Reduction", pp. 122-170.

Wang, L. et al., "Speckle Reduction in Laser Projections With Ultrasonic Waves," pp. 1659-1664, Optical Engineering, vol. 39, No. 6, Jun. 2000.

Leith, E. N. et al., "Imagery With Pseudo-Randomly Diffused Coherent Illumination," pp. 2085-2089, Applied Optics, vol. 7, No. 10, Oct. 1968.

Goodman, J.W., "Statistical Properties of Laser Speckle Patterns," in Dainty, J.C. (editor), *Laser Speckle and Related Phenomena*, Topics in Applied Physics, vol. 9, Springer Verlag, New York, 1984.

Goodman, J.W. et al., "Speckle Reduction by a Moving Diffuser in Laser Projection Displays," Silicon Light Machines, Sunnyvale, California, Presented at OSA Anuual Meeting 2000, Oct. 23, 2000.

Hedayat, A.S. et al., *Orthogonal Arrays, Theory and Applications*, Springer-Verlag, Chapter 7, New York, 1999.

"Combining the Effects of a Moving Diffuser and Temporal Averaging," Sep. 3, 1998.

* cited by examiner

17

METHOD AND APPARATUS FOR REDUCING LASER SPECKLE USING POLARIZATION AVERAGING

FIELD OF THE INVENTION

The present invention relates to the field of coherently illuminated systems. More particularly, the present invention relates to the field of reducing speckle in laser illuminated systems.

BACKGROUND OF THE INVENTION

Coherent light illuminating a rough surface produces speckle. Reflection from the rough surface is referred to as diffuse reflection. Transmission through the rough surface is referred to as diffuse transmission. In the diffuse reflection or the diffuse transmission, light scatters in various directions. The coherent light scattered by the diffuse reflection or by the diffuse transmission forms an interference pattern in the space away from the rough surface. If viewed by a human eye, the eye will see dark and light in a 'granular' pattern. The granular pattern is the speckle. An intensity detector of an optical system will also detect the speckle if the optical system views the rough surface illuminated by the coherent light.

A first speckle demonstration apparatus of the prior art is illustrated in FIG. 1. The first speckle demonstration apparatus 1 includes a first demonstration laser 2, a first diverging lens 4, and a first viewing screen 6, which are located on a first optic axis 8. The first demonstration laser 2 emits a first laser beam 10. The first diverging lens 4 transforms the first laser beam 10 into a divergent laser beam 12. The divergent laser beam 12 illuminates the first viewing screen 6 in a first large area 14. The first viewing screen 6 diffusely reflects the divergent laser beam 12 creating an interference pattern. An observation plane 16 located on a second optic axis 18 intersects the interference pattern. The observation plane 16 is the field-of-view in space where the eye or the optical system is focused. Note that the diverging lens 4 aids in demonstrating the speckle but is not necessary to produce the speckle.

FIG. 2 is a photograph of a typical speckle pattern 17 of the prior art, which is illustrative of the speckle viewed at the observation plane 16. Constructive interference of the divergent laser beam 12 reflecting diffusely from the viewing screen 6 creates bright spots in the observation plane 16. Destructive interference creates dark spots between the bright spots. The diffuse reflection from the viewing screen 6 has a random nature so the bright spots and the dark spots vary throughout the observation plane 16.

A measure of the speckle is contrast (C). The contrast, in percent, is given by $C = 100 * I_{RMS}/\bar{I}$ where $\bar{I}$ is a mean intensity and $I_{RMS}$ is a root mean square intensity fluctuation about the mean intensity.

Goodman in "Some fundamental properties of speckle" (J. Opt. Soc. A., vol. 66, no. 11, November 1976, pp 1145–1150) teaches that the speckle can be reduced by superimposing N uncorrelated speckle patterns. This reduces the contrast by $1/\sqrt{N}$ provided that the N uncorrelated speckle patterns have equal mean intensities and contrasts. If the N uncorrelated speckle patterns have non-equal mean intensities or non-equal contrasts, the speckle reduction factor will be greater than $1/\sqrt{N}$. Thus, the $1/\sqrt{N}$ reduction factor is a best case for the speckle reduction for the N uncorrelated speckle patterns.

Goodman further teaches that the uncorrelated speckle patterns can be obtained by means of time, space, frequency, or polarization. For example, the space means could be produced by a second demonstration laser, operating at the same wavelength as the first demonstration laser 2, and a second diverging lens located on a third optic axis that illuminates the first large area 14 of the first viewing screen 6. Provided that the first optic axis 8 and the third optic axis are separated by a sufficient angle, the speckle will be reduced by $1/\sqrt{2}$. Angular separation is necessary because, if the second demonstration laser having a second laser beam is configured such that the first laser beam 10 and the second laser beam coincide, there will be no reduction in the speckle provided that the time, frequency, or polarization means are not employed. This is because the first demonstration laser 2 and the second demonstration laser produce the same speckle patterns when the angular separation is not present. This is despite the fact that the first demonstration laser 2 is incoherent with the second demonstration laser.

Goodman further teaches that the polarization means could be a depolarizing screen, which reflects or transmits polarized light as randomly polarized diffuse light. The speckle pattern produced by the depolarizing screen differs significantly if viewed through a polarization analyzer while rotating the polarization analyzer. This indicates that two orthogonal polarization components illuminating the depolarizing screen produce two uncorrelated speckle patterns. Thus, if the viewing screen 6 is a 100% depolarizing screen, the contrast is reduced by $1/\sqrt{2}$.

Another method known in the art for creating multiple speckle patterns is to move the viewing screen 6 in an oscillatory motion 19, which employs the time means taught by Goodman. The oscillatory motion 19 typically follows a small circle or a small ellipse about the optic axis 8. This causes the speckle pattern to shift relative to the eye or the optical system viewing the viewing screen and, thus, forms multiple speckle patterns over time. Though the amount of the speckle at any instant in time is unchanged, the eye perceives the reduced speckle provided that the speed of the oscillatory motion is above a threshold speed. The intensity detector of the optical system detects the reduced speckle provided that an exposure time is sufficiently long to allow the speckle pattern to move a significant distance.

A second speckle demonstration apparatus of the prior art is illustrated in FIG. 3. The second speckle demonstration apparatus 20 includes a third demonstration laser 22, a cylindrical divergent lens 24, a scanning mirror 26, and a second viewing screen 28. The third demonstration laser 22 emits a third laser beam 30, which is coupled to the cylindrical divergent lens 24. The cylindrical divergent lens 24 transforms the third laser beam into a second divergent laser beam 32. The scanning mirror 26 reflects the second divergent laser beam 32. Thus, the second divergent laser beam 32 forms a line illumination 33 on the second viewing screen 28. The scanning mirror 26 repeatedly scans the line illumination 33 across a portion of the second viewing screen 28 with a scanning motion 34 having a scanning frequency. Thus, a second large area 36 is illuminated. If the eye or the optical system views the second viewing screen 28, the eye or the intensity detector will detect illumination across the second viewing screen 28 provided that the scanning frequency is sufficiently high. The eye or the intensity detector will also detect the speckle.

Speckle is a considerable problem in many laser illuminated systems. This difficulty is exacerbated by a relatively slow reduction in the contrast due to the $1/\sqrt{N}$ reduction factor. What is needed are additional methods of reducing laser speckle.

SUMMARY OF THE INVENTION

The present invention is a method and apparatus for reducing speckle using polarization averaging. A polarizing beam splitter is configured to split a first polarized laser output into a second polarized laser output and a third polarized laser output. A plurality of mirrors creates an optical path difference between the second polarized laser output and the third polarized laser output. The optical path difference is at least about a coherence length of the first polarized laser output. The second polarized laser output and the third polarized laser output are combined into a fourth laser output. The fourth laser output illuminates a depolarizing screen. If an optical system having an intensity detector or an eye views the depolarizing screen, the intensity detector or the eye will detect reduced speckle. The reduced speckle is due to an averaging effect caused by uncorrelated speckle patterns created by the second polarized laser output and the third polarized laser output.

A first alternative embodiment of the invention functions without the optical path difference being at least about the coherence length. In the first alternative embodiment, a piezoelectric transducer driven at a sufficient frequency varies the optical path difference by an odd multiple of a half wavelength of the first laser output. Varying the optical path difference with the sufficient frequency provides the uncorrelated speckle patterns. Thus, the intensity detector or the eye will detect the reduced speckle.

A second alternative embodiment employs the polarizing beam splitter, first and second quarter wave plates, first and second mirrors, and the piezoelectric transducer. The polarizing beam splitter splits the first polarized laser output into a fifth polarized laser output and a sixth polarized laser output each having linear polarizations. The first and second quarter wave plates convert the linear polarizations to circular polarizations. The first and second mirrors reflect the fifth polarized laser output and the sixth polarized laser output. The first and second quarter wave plates then convert the circular polarizations to the linear polarizations having rotated original polarizations by 90°. The piezoelectric transducer, coupled to the first mirror, varies an optical path length for the fifth polarized laser output by the odd multiple of the half wavelength of the first polarized laser output. The polarizing beam splitter combines the fifth polarized laser output and the sixth polarized laser output into a seventh laser output, which illuminates the depolarizing screen. By varying the optical path length with the sufficient frequency, the intensity detector or the eye will detect the reduced speckle.

A third alternative embodiment combines two orthogonally polarized laser outputs, from two lasers, into a combined laser output. The combined laser output illuminates the depolarizing screen.

A fourth alternative embodiment rotates a polarization of the first laser output with a rotation frequency to form a rotating polarization. The first laser output having the rotating polarization illuminates the depolarizing screen.

DETAILED DESCRIPTION OF THE PREFERRED EMBODIMENT

The present invention is based on the discovery that two orthogonally polarized laser outputs, which are incoherent, will produce four uncorrelated speckle patterns when illuminating a depolarizing screen.

Figure 1:
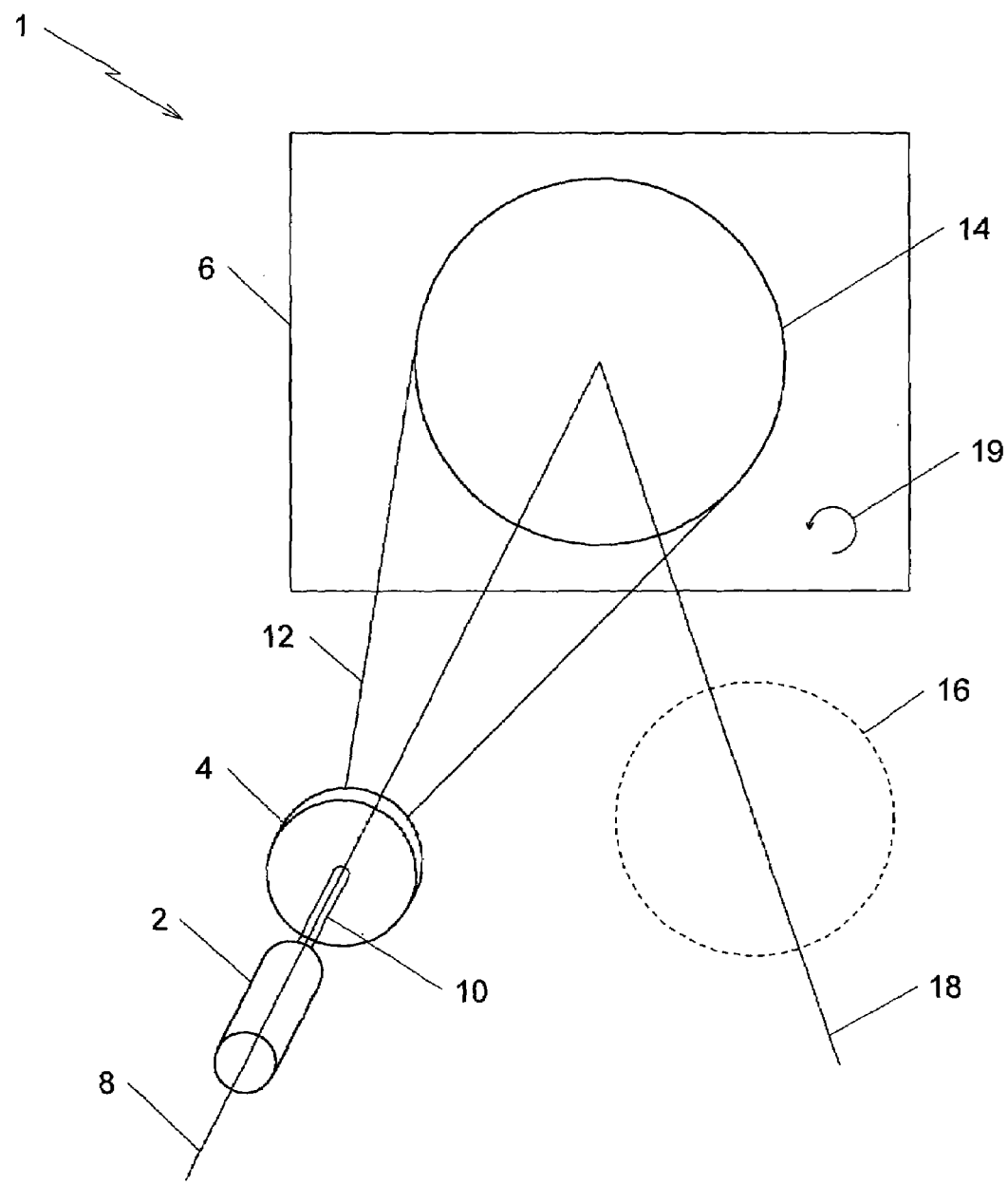
FIG. 1 illustrates an apparatus for demonstrating laser speckle of the prior art.
Figure 2:
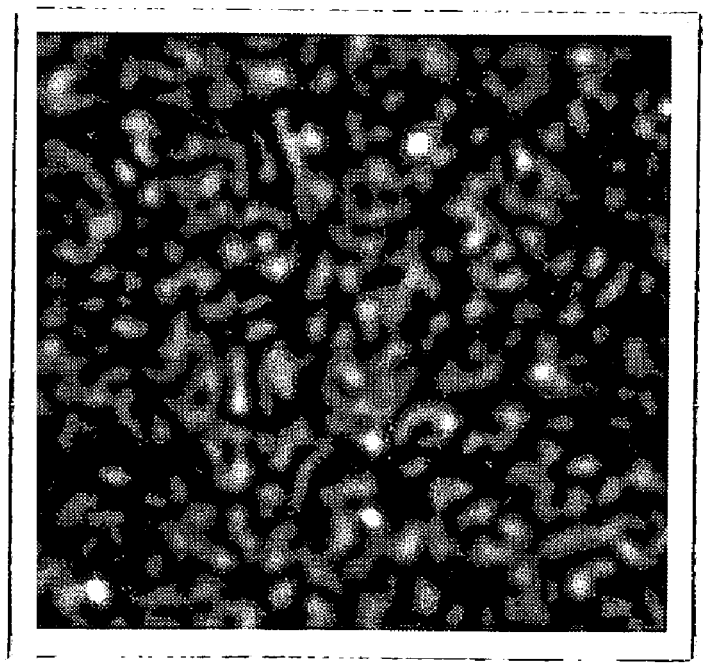
FIG. 2 is a photograph of a typical laser speckle pattern of the prior art.
Figure 3:
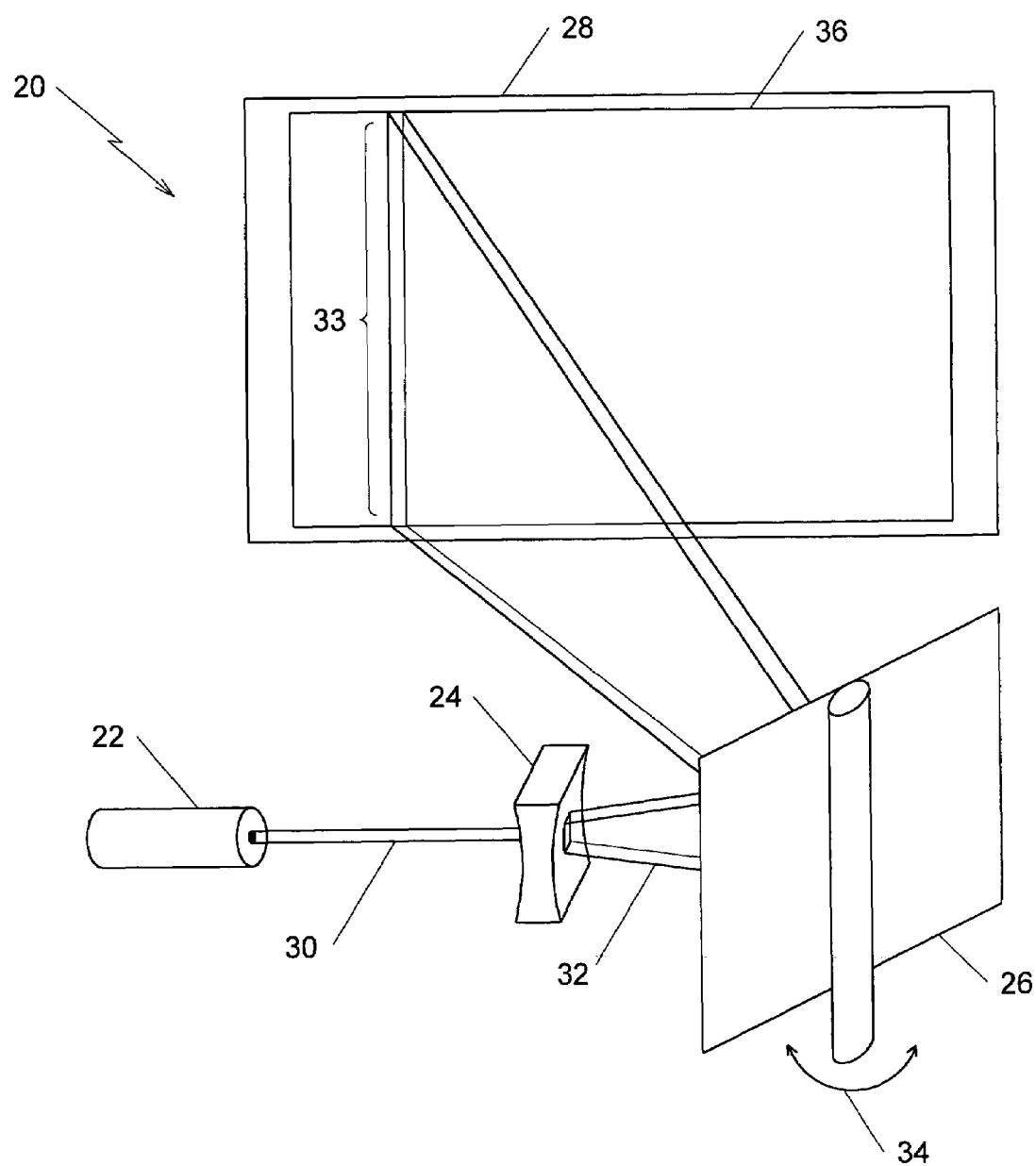
FIG. 3 illustrates a second apparatus for demonstrating laser speckle of the prior art.
Figure 4:
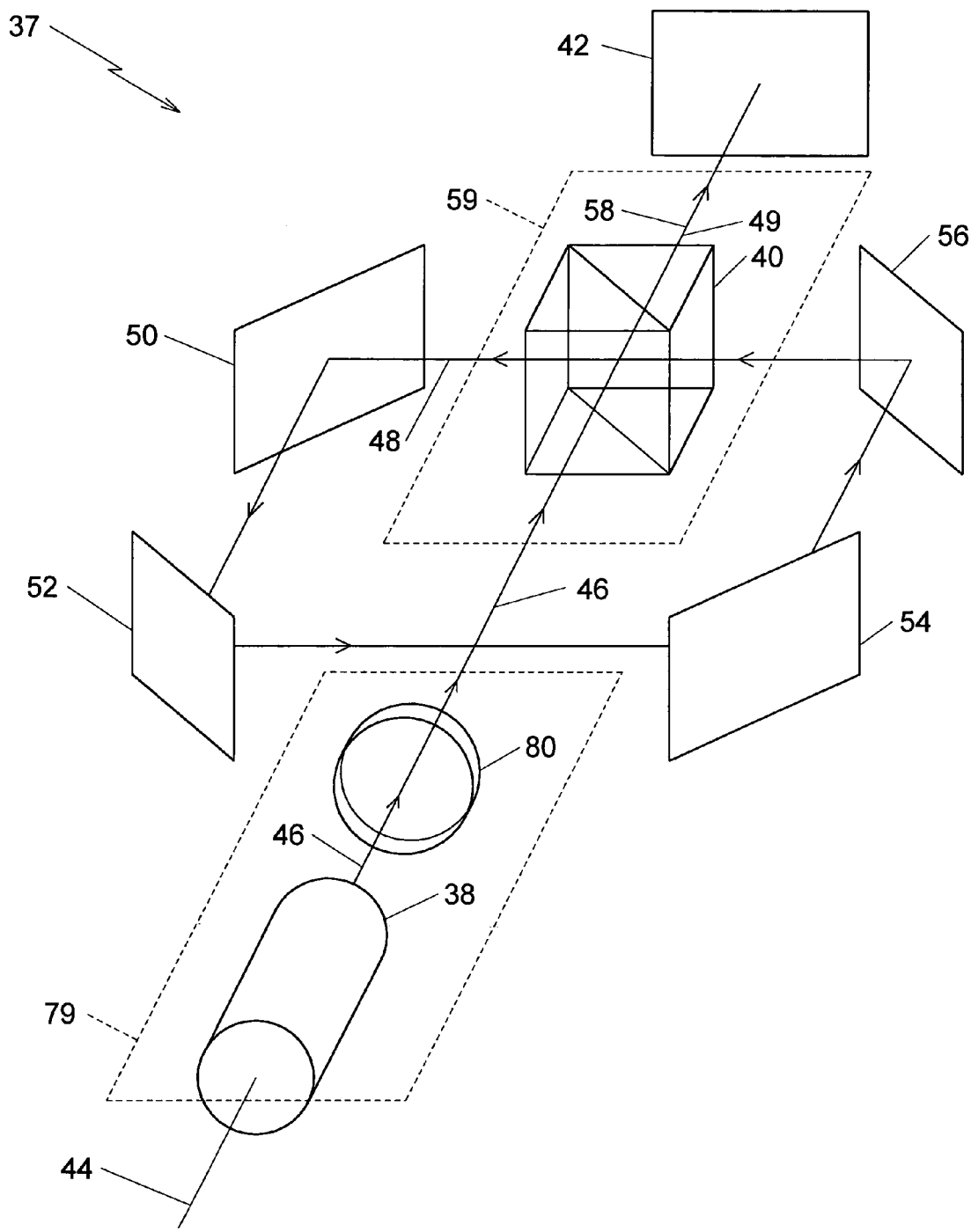
FIG. 4 illustrates an isometric view of the preferred embodiment of the present invention.

The preferred embodiment of the present invention is illustrated in FIG. 4. The preferred embodiment 37 includes a first laser 38, a half wave plate 80, a polarizing beam splitter 40, and the depolarizing screen 42, which are located on an optic axis 44. The first laser 38, having a coherence length, emits a first polarized laser output 46, which is a linearly polarized collimated beam. The first polarized laser output 46 is coupled to the polarizing beam splitter 40. The polarizing beam splitter 40 divides the first polarized laser output 46 into a second polarized laser output 48 and a third polarized laser output 49. The third polarized laser output 49 continues along the optic axis 44. The second polarized laser output 48 is reflected by a first mirror 50, a second mirror 52, a third mirror 54, and a fourth mirror 56. The first, second, third, and fourth mirrors 50, 52, 54, and 56 define a light guide. It will be readily apparent to one of ordinary skill in the art that more or fewer mirrors can be used to accomplish the objectives of the present invention.

After reflecting from the fourth mirror 56, the second polarized laser output 48 is reflected by the polarizing beam splitter 40, which combines the second polarized laser output 48 and the third polarized laser output 49 into a fourth laser output 58. By transmitting the second polarized laser output through the light guide, the second polarized laser output 48 has been shifted relative to the third polarized laser output 49 by an optical path difference. The fourth laser output 58 is then coupled to the depolarizing screen 42. The depolarizing screen 42 reflects or transmits the fourth laser output as randomly polarized diffuse light. If the depolarizing screen 42 reflects the fourth laser output 58, the depolarizing screen 42 comprises a diffuse reflecting screen. If the depolarizing screen 42 transmits the fourth laser output 58, the depolarizing screen 42 comprises a diffuse transmitting screen. An intensity detector of an optical system or an eye viewing the depolarizing screen 42 will detect reduced speckle provided that the optical path difference is at least a sufficient distance.

Preferably, the sufficient distance is the coherence length. Alternatively, the sufficient distance is less than the coherence length but reduction in the speckle will be less than if the sufficient distance is at least the coherence length.

Figure 5:
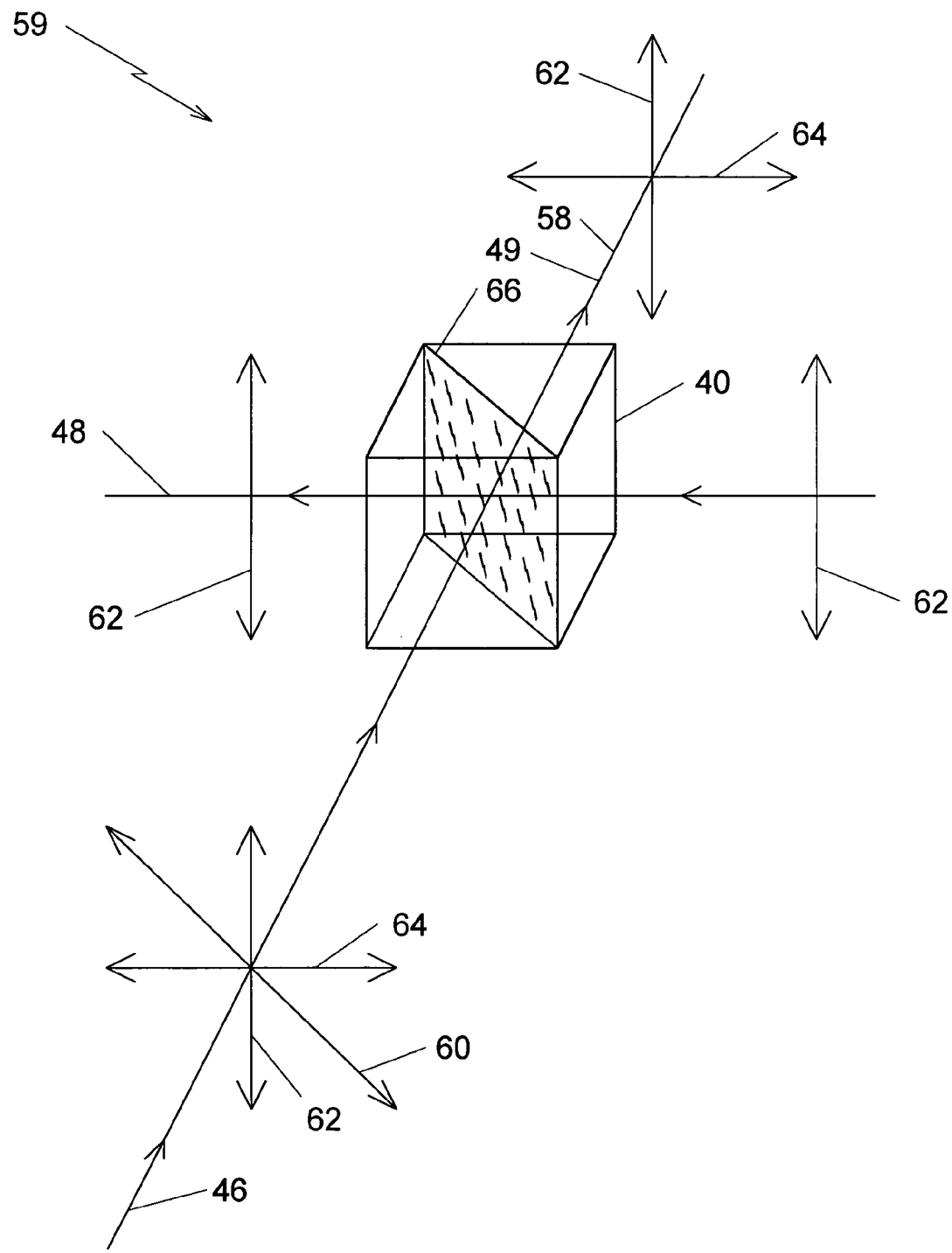
FIG. 5 illustrates a polarizing beam splitter of the present invention.

A first partial view 59 of FIG. 4 is further illustrated in FIG. 5. The first partial view 59 includes the polarizing beam splitter 40, the first and second polarized laser outputs, 46 and 48, and the fourth laser output 58. The first polarized laser output 46 has a first linear polarized E (electric) field 60. The first linear polarized E field 60 is a combination of a second linear polarized E field 62 and a third linear polarized E field 64, which are orthogonal polarizations of the first linear polarized E field 60. Preferably, the second linear polarized E field 62 and the third linear polarized E field 64 have equal amplitudes. In the preferred embodiment 37 (FIG. 4) the equal amplitudes are obtained by rotating the half wave plate 80 about the optic axis 44.

Referring to FIG. 5, the second linear polarized E field 62 is vertical and the third linear polarized E field 64 is horizontal. The polarizing beam splitter 40 reflects the first polarized laser output 46 having the second linear polarized E field 62 from a polarizing beam splitting reflector 66 while allowing the first polarized laser output having the third linear polarized E field 64 to pass through the polarizing-beam splitting reflector 66. Thus, the second polarized laser output 48 is the first polarized laser output 46 having the second linear polarized E field 62. Also, the third polarized laser output 49 is the first polarized laser output 46 having the third linear polarized E field 64.

The first polarized laser output 46 and the second polarized laser output 48 define a plane of incidence relative to the polarizing beam splitting reflector 66. It is a convention of optics to refer to the second linear polarized E field 62 as an s-polarization and the third linear polarized E field 64 as a p-polarization, where the s indicates perpendicular to the plane of incidence and the p indicates parallel to the plane of incidence. It will be readily apparent to one skilled in the art that the first linear polarized E field 60 could be replaced by a circularly polarized E field.

Figure 6:
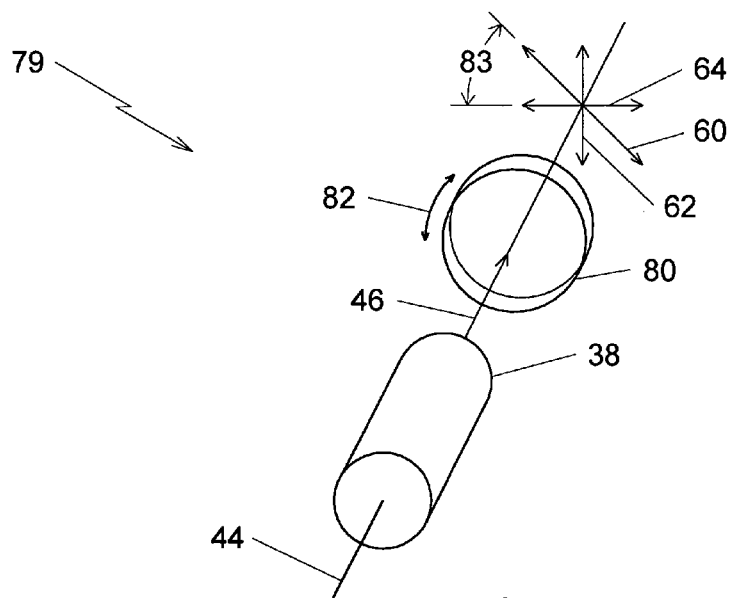
FIG. 6 illustrates a laser and a half wave plate of the present invention.

A second partial view 79 of FIG. 4 is further illustrated in FIG. 6. The second partial view 79 includes the first laser 38 and the half wave plate 80. A rotation 82 of the half wave plate 80 about the optic axis 44 rotates the first linear polarized E field 60 such that a polarization angle 83 is adjusted. The rotation 82 is used to equalize the amplitudes of the second linear polarized E field 62 and the third linear polarized E field 64. It will be readily apparent to one skilled in the art that the half wave plate 80 can be eliminated since the amplitudes of the second and third linear polarized E fields, 62 and 64, can be equalized by rotating the first laser 38.

Figure 7:
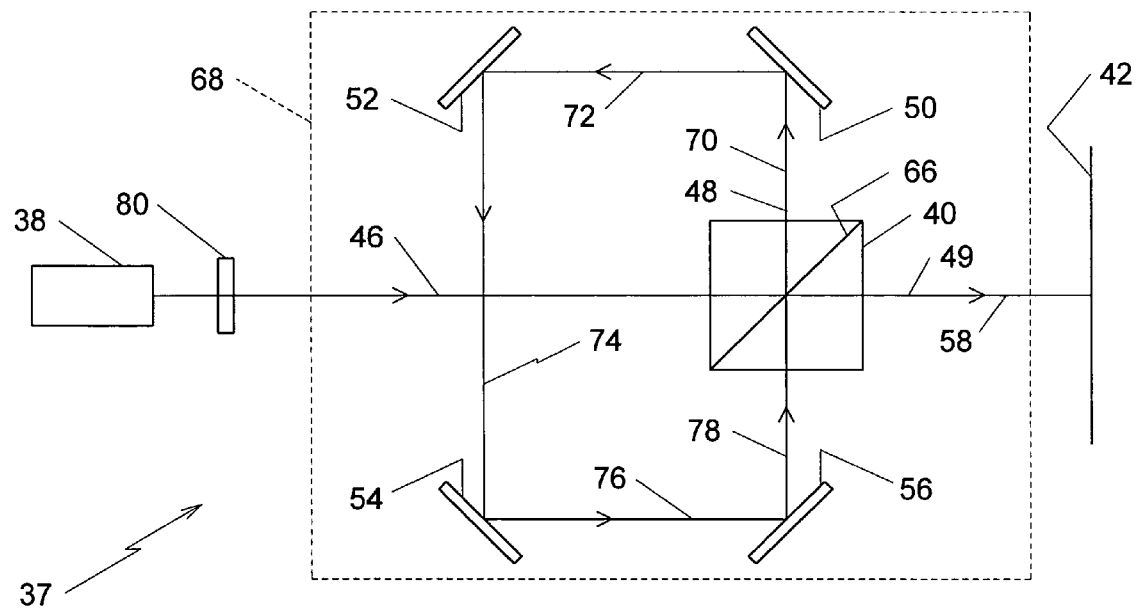
FIG. 7 illustrates a plan view of the preferred embodiment of the present invention.

A plan view of the preferred embodiment 37 is illustrated in FIG. 7, including the polarizing beam splitter 40 and the first, second, third, and fourth mirrors 50, 52, 54, and 56, which are defined as a speckle reducing arrangement 68. The polarizing beam splitter 40 divides the first polarized laser output 46 into the second polarized laser output 48 and the third polarized laser output 49. The second polarized laser output 48 travels a first optical path length 70 from the polarizing beam splitting reflector 66 to the first mirror 50. The second polarized laser output 48 travels a second optical path length 72 from the first mirror 50 to the second mirror 52. The second polarized laser output 48 travels a third optical path length 74 from the second mirror 52 to the third mirror 54. The second polarized laser output 48 travels a fourth optical path length 76 from the third mirror 54 to the fourth mirror 56. The second polarized laser output 48 travels a fifth optical path length 78 from the fourth mirror 56 to the polarizing beam splitting reflector 66. The first, second, third, fourth, and fifth optical path lengths, 70, 72, 74, 76, and 78, are optical path lengths, each of which is a summation of geometric length times index of refraction.

The first, second, third, fourth, and fifth optical path lengths 70, 72, 74, 76, and 78 define the optical path difference. It will be readily apparent to one skilled in the art that the second, third, and fourth optical path lengths 72, 74, and 76 may, but do not necessarily, lie in a plane defined by the first polarized laser output 46, the first optical path length 70, and the fifth optical path length 78.

After the second polarized laser output 48 traverses the optical path difference, the polarizing beam splitting reflector 66 reflects the second polarized laser output 48 such that the second polarized laser output 48 and the third polarized laser output 49 combine to form the fourth laser output 58. The fourth laser output 58 illuminates the depolarizing screen 42. Preferably, the optical path difference is equal to or greater than the coherence length for the first laser 38. As a result, the speckle produced by the p-polarization and the s-polarization are incoherent. Alternatively, the optical path difference is less than the coherence length but this results in less speckle reduction because the p-polarization and the s-polarization are partially coherent.

The depolarizing screen 42 produces first and second speckle patterns from the p-polarization, which are uncorrelated. The depolarizing screen 42 also produces third and fourth speckle patterns from the s-polarization, which are uncorrelated. For the optical path difference being at least the coherence length, the first, second, third, and fourth speckle patterns are uncorrelated because the s-polarization and p-polarization are incoherent. Thus, the speckle reducing arrangement 68 and the depolarizing screen 42 produce a total of four uncorrelated speckle patterns. Speckle is theoretically reduced by a speckle reduction factor of $1/\sqrt{4}=\frac{1}{2}$. The speckle reduction factor of ½ is a combination of the depolarizing screen 42, which contributes a $1/\sqrt{2}$ factor, and the speckle reducing arrangement 68, which contributes an additional $1/\sqrt{2}$ factor.

For the optical path difference being less than the coherence length, there is a partial correlation between the first and third speckle patterns and between the second and fourth speckle patterns since the p-polarization and the s-polarization are partially coherent. In this case the speckle reduction factor will be between $1/\sqrt{2}$ and ½.

Figure 8:
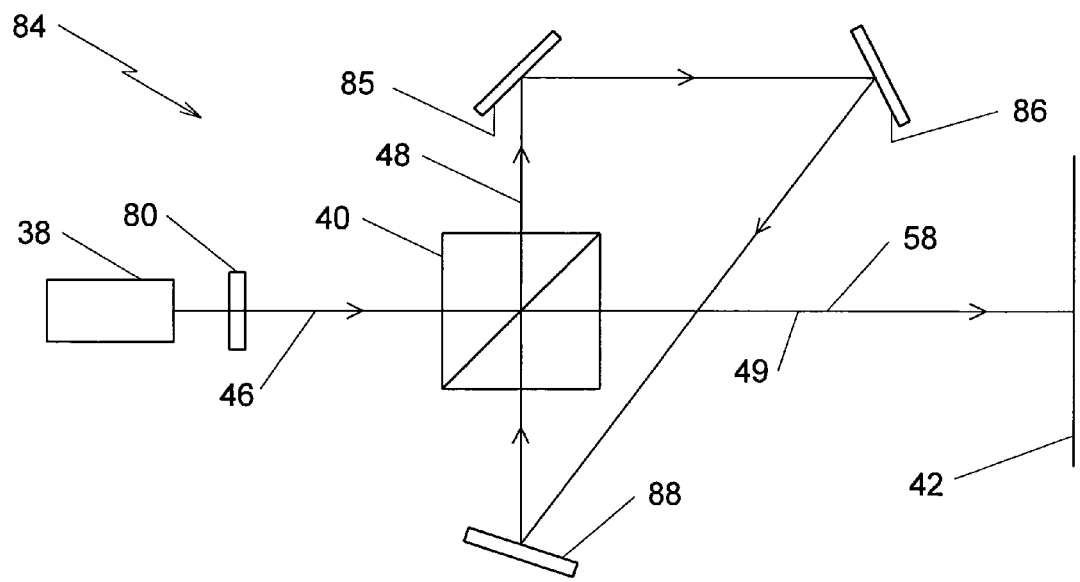
FIG. 8 illustrates a first alternative embodiment of the present invention.

A first alternative embodiment of the present invention is illustrated in FIG. 8. The first alternative embodiment 84 includes a fifth mirror 85, a sixth mirror 86, and a seventh mirror 88. The fifth, sixth, and seventh mirrors, 85, 86, and 88, form the light guide, which provides the optical path difference for the second polarized laser output 48.

Figure 9:
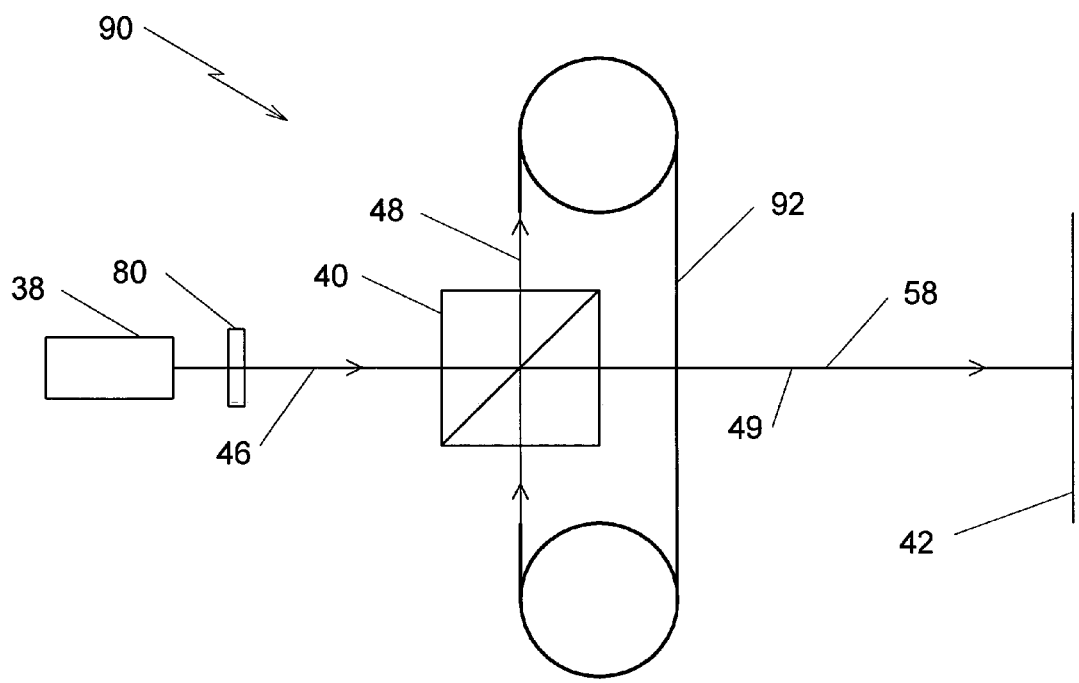
FIG. 9 illustrates a second alternative embodiment of the present invention.

A second alternative embodiment of the present invention is illustrated in FIG. 9. The second alternative embodiment 90 includes a polarization preserving fiber optic 92, which forms the light guide providing the optical path difference for the second polarized laser output 48.

Figure 10:
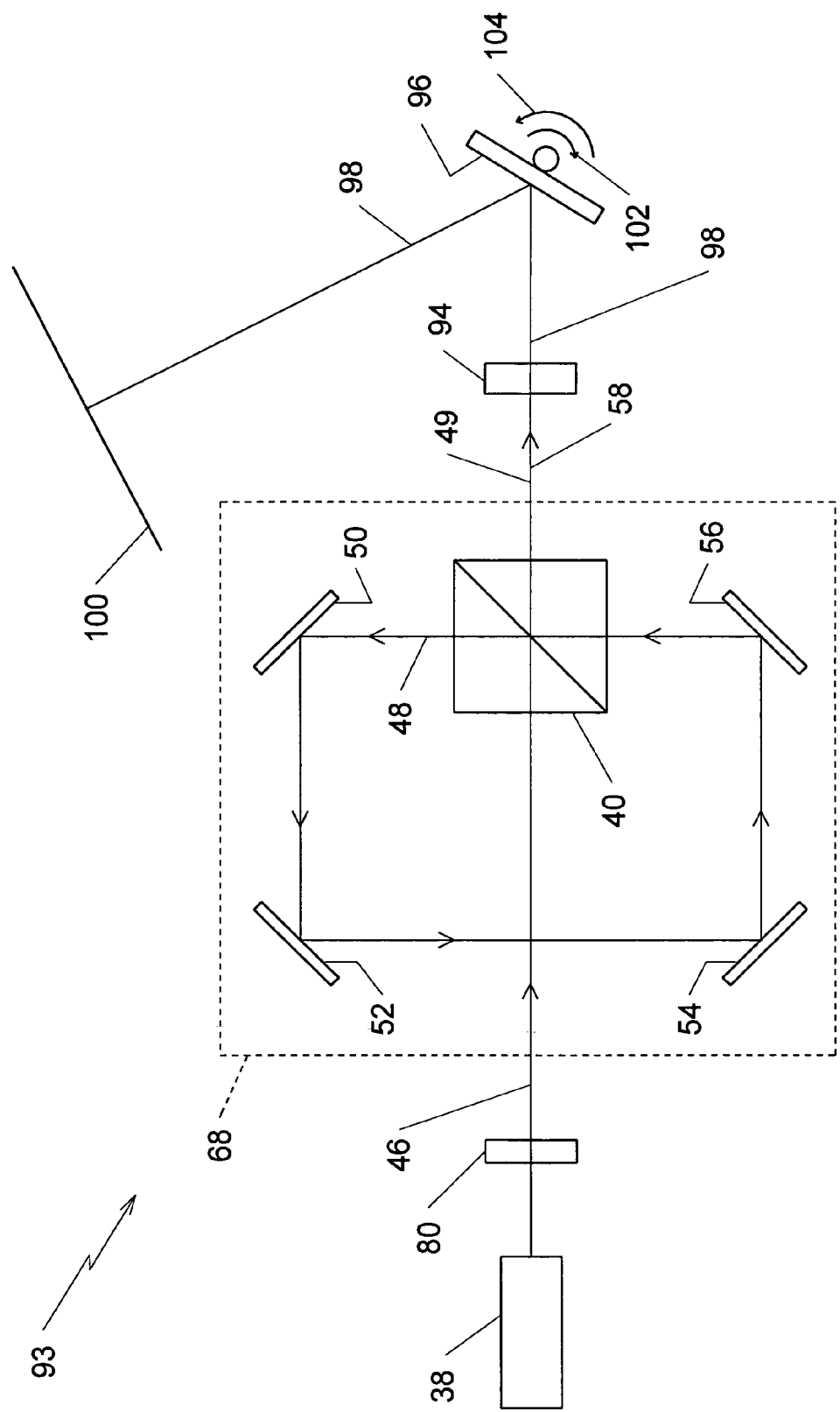
FIG. 10 illustrates a third alternative embodiment of the present invention.

A third alternative embodiment of the present invention is illustrated in FIG. 10. The third alternative embodiment 93 includes the first laser 38, the half wave plate 80, the speckle reducing arrangement 68, a cylindrical divergent lens 94, a scanning mirror 96, and a second depolarizing screen 100. The cylindrical divergent lens transforms the fourth laser output 58 into a divergent laser beam 98. The scanning mirror reflects the divergent laser beam 98 onto the depolarizing screen 42 and, thus, forms a line illumination on the depolarizing screen 42. The scanning mirror scans the line illumination across the second depolarizing screen 100 with a sawtooth scan motion. The sawtooth scan motion has two components. In a first scan motion 102, the scanning mirror scans the line illumination 98 across the second depolarizing screen 100. In a second scan motion 104, the scanning mirror returns to the start of the first scan motion 102. The second scan motion 104 is much faster than the first scan motion 102. The sawtooth scan motion alternately repeats the first scan motion 102 and the second scan motion 104. Thus, the first scan motion 102 provides a predominant illumination of the second depolarizing screen 100. It will be readily apparent to one skilled in the art that other scan motions or sequences may be used to illuminate the second depolarizing screen 100.

In the third alternative embodiment 93, the speckle is reduced by the four uncorrelated speckle patterns. The four uncorrelated speckle patterns are due to the combination of the second depolarizing screen 100 and the optical path difference, which is provided by the speckle reducing arrangement 68.

Figure 11:
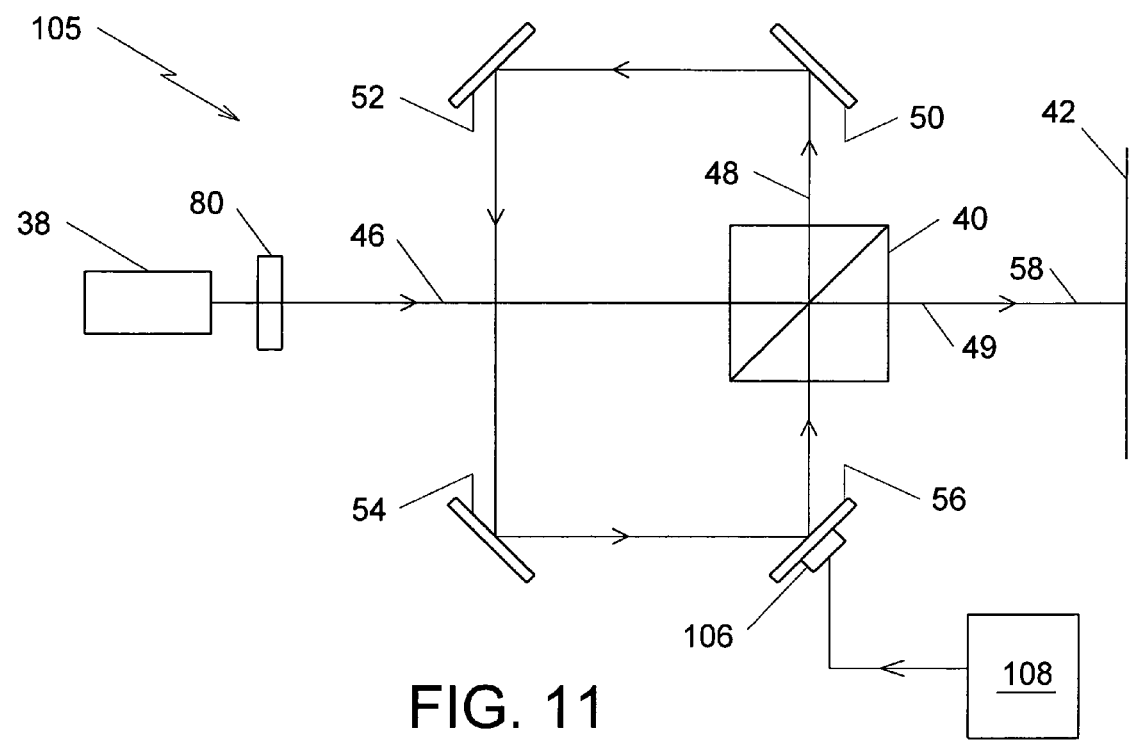
FIG. 11 illustrates a fourth alternative embodiment of the present invention.

If the first laser 38 has a long coherence length it may be difficult or impractical to make the optical path difference equal to or greater than the coherence length of the first laser 38. A fourth alternative embodiment of the present invention, which accounts for the long coherence length, is illustrated in FIG. 11. The fourth alternative embodiment 105 adds a piezoelectric transducer 106 to the preferred embodiment. In the fourth alternative embodiment 105, the piezoelectric transducer 106 is coupled to the fourth mirror 56. It will be readily apparent to one skilled in the art that the piezoelectric transducer 106 may be coupled to the first, second or third mirror, 50, 52, or 54, or that the piezoelectric transducer 106 may be coupled to multiple mirrors.

In the fourth alternative embodiment 105, the piezoelectric transducer 106 moves the fourth mirror 56 such that the optical path difference is varied by an amplitude. By varying the optical path difference with a sufficient frequency, the third and fourth speckle patterns shift relative to the first and second speckle patterns and the eye, or the intensity detector, detects the reduced speckle. The sufficient frequency is determined by an integration time for the eye or the intensity detector. A first electrical signal 108 drives the piezoelectric transducer 94. The first electrical signal 108 is preferably an oscillating voltage driven at the sufficient frequency. It will readily apparent to one skilled in the art that other electrical signals may be used to drive the piezoelectric transducer 106 including a randomly fluctuating signal.

Preferably, the electrical signal 108 is a square wave signal. For the square wave signal, the amplitude is preferably an odd multiple of a half wavelength of the first polarized laser output 46. Alternatively, the electrical signal 108 is a non-square wave signal, such as a sinusoidal signal. For the non-square wave signal, the amplitude is preferably at least the half wavelength of the first polarized laser output 46.

Figure 12:
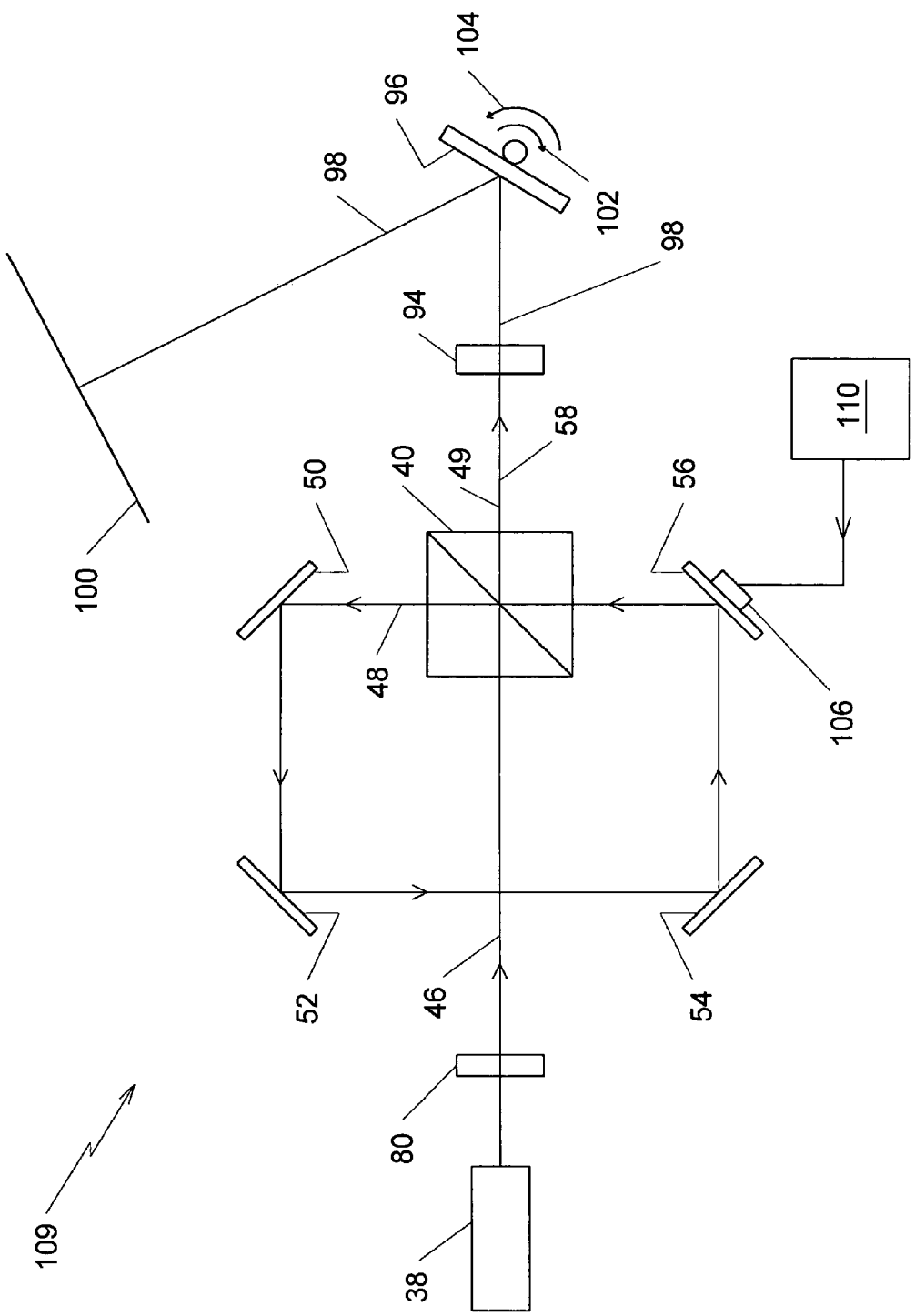
FIG. 12 illustrates a fifth alternative embodiment of the present invention.

A fifth alternative embodiment of the present invention is illustrated in FIG. 12. The fifth alternative embodiment 109 adds the piezoelectric transducer 106 to the third alternative embodiment 93. In the fifth alternative embodiment 109, the optical path difference is not necessarily equal to or greater than the coherence length. In the fifth alternative embodiment 109, the piezoelectric transducer 106 varies the optical path difference by the odd multiple of the half wavelength of the first polarized laser output 46. In the fifth alternative embodiment 109, a second electrical signal 110 drives the piezoelectric transducer 106. The second electrical signal 110 is a square wave voltage having a first voltage level, a second voltage level, and a square wave period. A difference between the first voltage level and the second voltage level shifts the optical path difference by the odd multiple of the half wavelength. The square wave period is one cycle of the first voltage level and the second voltage level.

In the fifth alternative embodiment 109, the first scan motion 102 and the second scan motion 104 is defined as a scan period. For a first scan period, the square wave voltage has the first voltage level. For a second scan period, immediately following the first scan period, the square wave voltage has the second voltage level. For subsequent scans, the square wave period corresponds to two scan periods such that, for a third scan period, the square wave voltage has the first voltage level and, for a fourth scan period, the square wave voltage has the second voltage level. Thus, the third and fourth uncorrelated speckle patterns shift relative to the first and second uncorrelated speckle patterns in each pair of scan periods. The speckle is reduced by a combination of the depolarizing screen 100, the sawtooth scan motion, and the shifting third and fourth uncorrelated speckle patterns.

Figure 13:
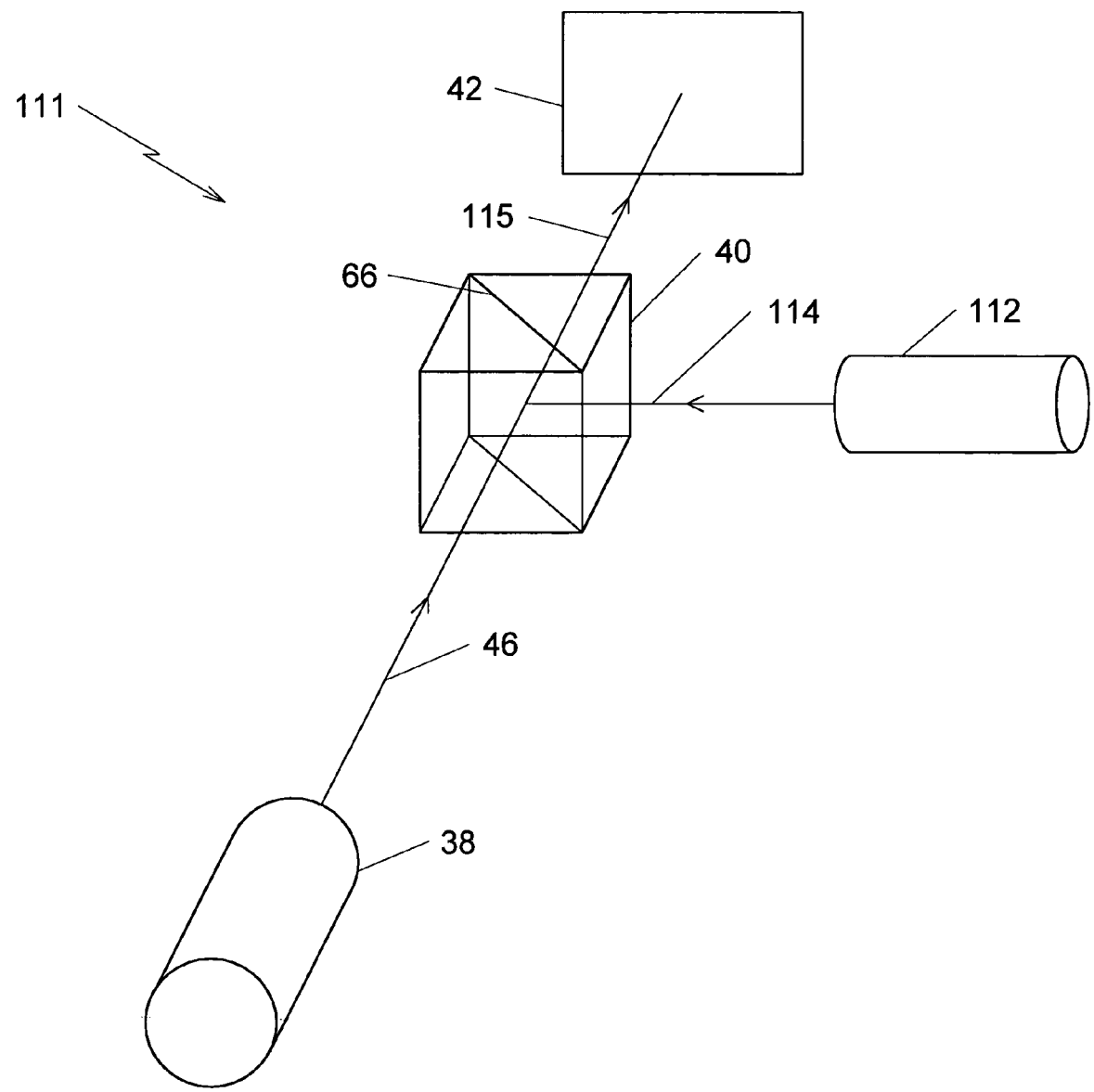
FIG. 13 illustrates a sixth alternative embodiment of the present invention.

A sixth alternative embodiment of the present invention is illustrated in FIG. 13. The sixth alternative embodiment 111 adds a second laser 112 to the first laser 38, the polarizing beam splitter 40, and the depolarizing screen 42. The first laser 38 is configured such that the first polarized laser output 46 has an E field oriented in a p-polarization relative to the polarizing beam splitting reflector 66. The second laser 112 is configured such that a fifth polarized laser output 114 has an E field oriented in an s-polarization relative to the polarizing beam splitting reflector 66. The polarizing beam splitting reflector 66 includes multilayered dielectrics that reflect the s-polarization and transmit the p-polarization. The first polarized laser output 46 passes through the polarizing beam splitting reflector 66. The fifth polarized laser output 114 reflects from the polarizing beam splitting reflector 66.

In the sixth alternative embodiment 111, the first polarized laser output 46 and the fifth polarized laser output 114 combine to form a combined laser output 115. The combined laser output 115 illuminates the depolarizing screen 42. Since the first laser 38 and the second laser 112 are incoherent with each other, the combined laser output 115 produces four uncorrelated speckle patterns upon illumination of the depolarizing screen 42. It will be readily apparent to one skilled in the art that the polarizing beam splitter 40 could be replaced by a device that functions similarly to the multilayered dielectrics of the polarizing beam splitting reflector 66.

Figure 14:
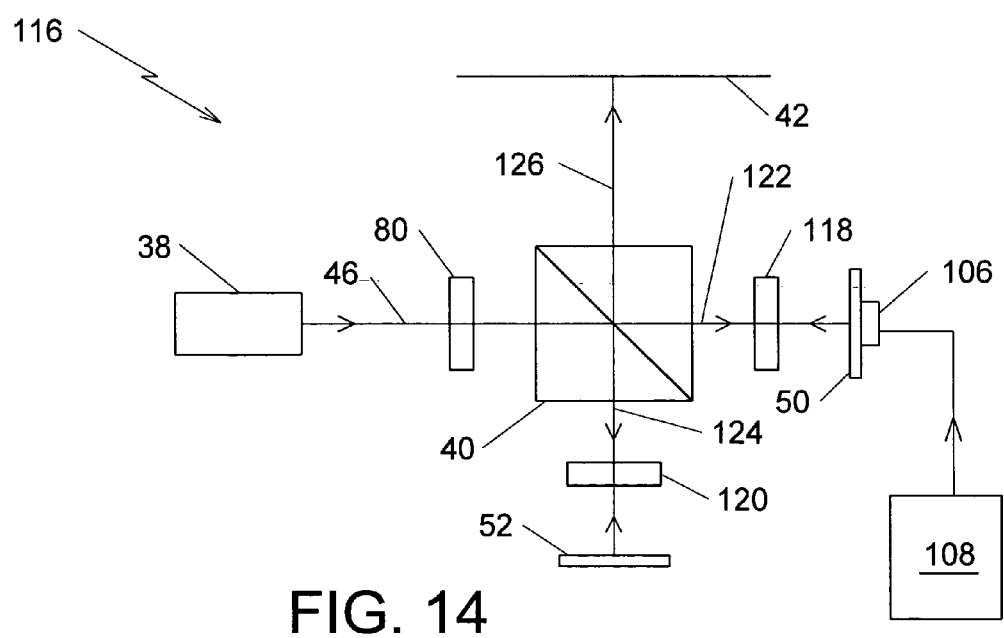
FIG. 14 illustrates a seventh alternative embodiment of the present invention.

A seventh alternative embodiment of the present invention is illustrated in FIG. 14. The seventh alternative embodiment 116 includes the first laser 38, the half wave plate 80, the polarizing beam splitter 40, the first and second mirrors, 50 and 52, the depolarizing screen 42, the piezoelectric transducer 106, the first electrical signal 108, and first and second quarter wave plates, 118 and 120. The polarizing beam splitter 40 divides the first polarized laser output 46 into sixth and seventh polarized laser outputs, 122 and 124, having the p-polarization and the s-polarization, respectively. The first and second quarter wave plates, 118 and 120, have first and second optic axes oriented at 45° to the p-polarization and the s-polarization of the sixth and seventh polarized laser outputs, 122 and 124, respectively. The first and second quarter wave plates, 118 and 120, convert the p-polarization and the s-polarization polarizations of the sixth and seventh polarized laser outputs, 122 and 124, respectively, to circular polarizations. The first and second mirrors, 50 and 52, reflect the sixth and seventh polarized laser outputs, 122 and 124. The piezoelectric transducer 106, driven by the first electrical signal 108, varies a sixth optical path length for the sixth polarized laser output 122 by the amplitude. The first electrical signal 108 is preferably the oscillating voltage driven at the sufficient frequency.

Upon the sixth and seventh polarized laser outputs, 122 and 124, returning to the first and second quarter wave plates, 118 and 120, the first and second quarter wave plates, 118 and 120, convert the sixth and seventh polarized laser outputs, 122 and 124, to the s-polarization and the p-polarization, respectively. The polarizing beam splitter 40 reflects the sixth polarized laser output 122 and transmits the seventh polarized laser output 124, thus forming an eighth laser output 126, which illuminates the depolarizing screen 42. The speckle is reduced by two pairs of uncorrelated speckle patterns, which are further uncorrelated by varying the sixth optical path length by the amplitude.

Figure 15:
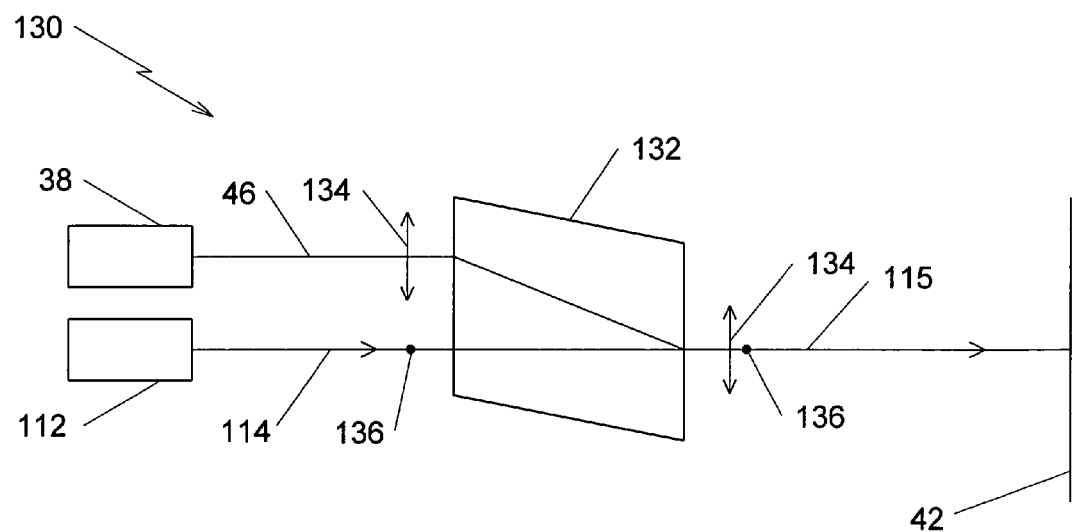
FIG. 15 illustrates an eighth alternative embodiment of the present invention.

An eighth alternative embodiment is illustrated in FIG. 15. The eighth alternative embodiment 130 includes the first and second lasers, 38 and 112, a birefringent crystal 132, and the depolarizing screen 42. The first laser 38 has a fourth linear polarized E field 134. The second laser 112 has a fifth linear polarized E field 136. The birefringent crystal 132 is oriented such that the first polarized laser output 46 becomes an extraordinary ray within the birefringent crystal 132 and further such that the fifth polarized laser output 114 becomes an ordinary ray within the birefringent crystal 132. Upon exiting from the birefringent crystal 132, the first and fifth polarized laser outputs, 46 and 114, have combined to form the combined laser output 115. The combined laser output 115 illuminates the depolarizing screen 42.

Figure 16:
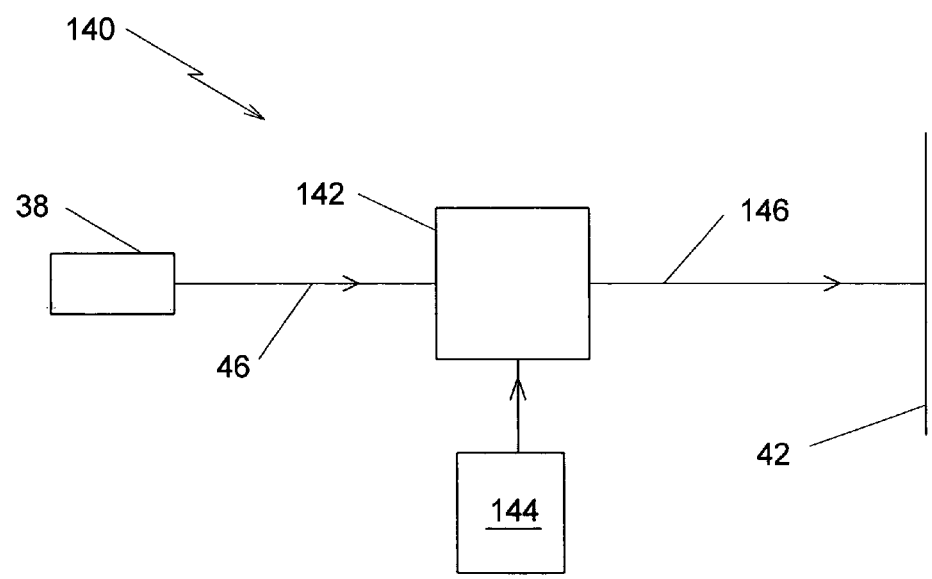
FIG. 16 illustrates a ninth alternative embodiment of the present invention.

A ninth alternative embodiment is illustrated in FIG. 16. The ninth alternative embodiment 140 includes the first laser 38, a polarization rotator 142, and the depolarizing screen 42. In the ninth alternative embodiment 140, the polarization rotator 142 is driven by a third electrical signal 144. The polarization rotator 142 rotates a polarization of the first polarized laser output 46 to form a ninth laser output 146 having a rotating polarization. The ninth laser output illuminates the depolarizing screen 42. The ninth laser output 146 having the rotating polarization produces the four uncorrelated speckle patterns. Provided that a rotation frequency is sufficient, the eye or the intensity detector averages the four uncorrelated speckle patterns and, thus, the eye or the intensity detector detects the reduced speckle. The polarization rotator 142 is preferably an electro-optic polarization rotator such as a liquid crystal polarization rotator, a Pockels cell, or a Kerr cell. Alternatively, the polarization rotator is a half wave plate that is mechanically rotated.

Figure 17:
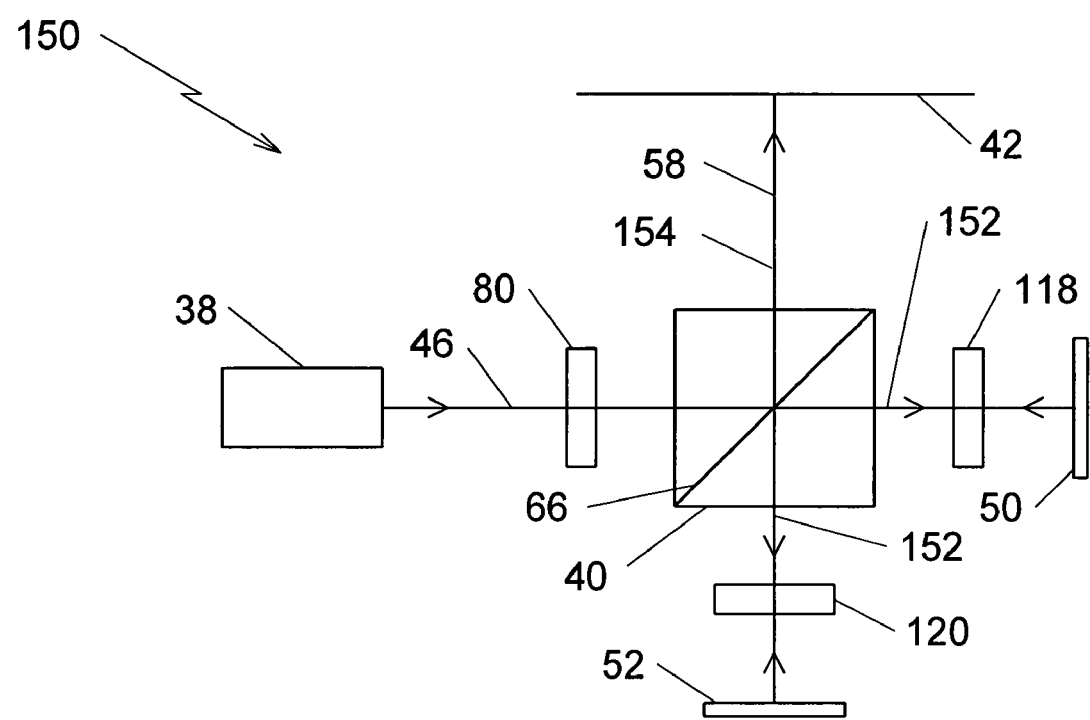
FIG. 17 illustrates a tenth alternative embodiment of the present invention.

A tenth alternative embodiment of the present invention is illustrated in FIG. 17. The tenth alternative embodiment 150 includes the first laser 38, the half wave plate 80, the polarizing beam splitter 40, the first and second mirrors, 50 and 52, the depolarizing screen 42, and the first and second quarter wave plates, 118 and 120. The polarizing beam splitter 40 divides the first polarized laser output 46 into a tenth polarized laser output 152 and an eleventh polarized laser output 154 having the p-polarization and the s-polarization, respectively. The polarizing beam splitter 40 transmits the tenth polarized laser output 152 toward the first quarter wave plate 118. The polarizing beam splitter reflects the eleventh polarized laser output 154 toward the depolarizing screen 42.

The first quarter wave plate 118 has the first optic axis oriented at 45° to the p-polarization of the tenth polarized laser output 152. The first quarter wave plate 118 converts the p-polarization of the tenth polarized laser output 152 to the circular polarization. The first mirror 50 reflects the tenth polarized laser output 152. Upon the tenth polarized laser output 152 returning to the first quarter wave plate 1118, the first quarter wave plate converts the circular polarization to the s-polarization. Thus, the tenth polarized laser output 152 travels a seventh optical path length from the polarizing beam splitter reflector 66 to the first mirror 50 and back to the polarizing beam splitter reflector 66. The polarizing beam splitter 40 then reflects the tenth polarized laser output 152 toward the second quarter wave plate 120.

The second quarter wave plate 120 has the second optic axis oriented at 45° to the s-polarization of the tenth polarized laser output 152. The second quarter wave plate 120 converts the s-polarization of the tenth polarized laser output 152 to the circular polarization. The second mirror 52 reflects the tenth polarized laser output 152. Upon the tenth polarized laser output 152 returning to the second quarter waver plate 120, the second quarter wave plate 120 converts the circular polarization to the p-polarization. Thus, the tenth polarized laser output 152 travels an eighth optical path length from the polarizing beam splitter reflector 66 to the second mirror 52 and back to the polarizing beam splitter reflector 66.

The polarizing beam splitter 40 transmits the tenth polarized laser output 152 and, thus, combines the tenth polarized laser output 152 and the eleventh polarized laser output 154 to form the fourth laser output 58 having the optical path difference between the tenth polarized laser output 152 and the eleventh polarized laser output 154. The seventh and eighth optical path lengths define the light guide for the optical path difference. Preferably, the optical path difference is at least the coherence length. The fourth laser output 58 illuminates the depolarizing screen 42 and, thus, the speckle is reduced by the four uncorrelated speckle patterns.

It will be readily apparent to one skilled in the art that in the tenth alternative embodiment 150, the first and second quarter wave plates, 118 and 120, can be eliminated by configuring the first mirror 50 to reflect the tenth polarized laser output 152 to the second mirror 52 and configuring the second mirror 52 to reflect the tenth polarized laser output 152 to the polarizing beam splitter 66.

First and second tests were performed using a first test arrangement similar to the preferred embodiment 37. In the first test, the speckle reducing arrangement 68 was not present. In the second test, the speckle reducing arrangement 68 was present. Theoretically, the speckle reducing arrangement 68 should reduce the contrast by a reduction factor of $0.707=1/\sqrt{2}$ since the speckle reducing arrangement 68 doubles the number of uncorrelated speckle patterns. In the first test, the contrast was found to be 56.8%. In the second test, the contrast was found to be 42.2%. This amounted to a reduction factor of 0.743, which is close to the theoretical limit of 0.707.

It will be readily apparent to one skilled in the art that other various modifications may be made to the preferred embodiment without departing from the spirit and scope of the invention as defined by the appended claims.

What is claimed is:

1. An apparatus for reducing laser speckle comprising:
   a. a polarizing beam splitter configured to divide a first polarized laser output into a second polarized laser output and a third polarized laser output, the first polarized laser output having a coherence length;
   b. a light guide comprising a polarization preserving fiber optic, the light guide configured to create an optical path difference between the second polarized laser output and the third polarized laser output, the optical path difference being at least about the coherence length, the light guide being configured to direct the second polarized laser output to the polarizing beam splitter such that the polarizing beam splitter combines the second polarized laser output and the third polarized laser output into a fourth laser output; and
   c. a depolarizing screen coupled to the fourth laser output, the fourth laser output illuminating the depolarizing screen.

2. An apparatus for reducing laser speckle, comprising;
   a. a polarizing beam splitter configured to divide a first polarized laser output into a second polarized laser output and a third polarized laser output;
   b. a plurality of mirrors configured to create an optical path difference between the second polarized laser output and the third polarized laser output, the plurality of mirrors configured to direct the second polarized laser output to the polarizing beam splitter such that the polarizing beam splitter combines the second polarized laser output and the third polarized laser output into a fourth laser output;
   c. a piezoelectric transducer coupled to at least one of the mirrors, the piezoelectric transducer being driven by an electrical signal such that the optical path difference is varied by an amplitude, the amplitude being at least about a half wavelength of the first polarized laser output, the electrical signal having an electrical signal frequency; and
   d. a depolarizing screen coupled to the fourth laser output, the fourth laser output illuminating the depolarizing screen, the electrical signal frequency being at least a sufficient frequency such that laser speckle is reduced.

3. The apparatus of claim 2 further comprising a half wave plate coupled to the first polarized laser output, the half wave plate being configured to adjust a first polarization angle for the first polarized laser output such that the second polarized laser output and the third laser output have intensities that are about equal.

4. The apparatus of claim 3 wherein the depolarizing screen comprises a diffuse reflecting surface.

5. The apparatus of claim 4 further comprising a laser for providing the first polarized laser output.

6. The apparatus of claim 3 wherein the depolarizing screen comprises a diffuse transmitting surface.

7. The apparatus of claim 6 further comprising a laser for providing the first polarized laser output.

8. The apparatus of claim 2 further comprising a laser for providing the first polarized laser output, the laser being configured such that intensities of the second polarized laser output and the third polarized laser output are about equal.

9. The apparatus of claim 8 wherein the depolarizing screen comprises a diffuse reflecting surface.

10. The apparatus of claim 8 wherein the depolarizing screen comprises a diffuse transmitting surface.

11. The apparatus of claim 2 wherein the polarizing beam splitter divides the first polarized laser output by reflecting the second polarized laser output and transmitting the third polarized laser output.

12. The apparatus of claim 11 wherein the polarizing beam splitter combines the second polarized laser output and the third polarized laser output by reflecting the second polarized laser output.

13. The apparatus of claim 2 wherein the polarizing beam splitter divides the first polarized laser output by transmitting the second polarized laser output and reflecting the third polarized laser output.

14. The apparatus of claim 13 wherein the polarizing beam splitter combines the second polarized laser output and the third polarized laser output by transmitting the second polarized laser output.

15. The apparatus of claim 2 wherein the electrical signal comprises a non-square wave signal.

16. The apparatus of claim 2 wherein the electrical signal comprises a square wave signal and further wherein the amplitude is about an odd multiple of the half wavelength of the first polarized laser output.

17. An apparatus for reducing laser speckle:
   a. means for dividing a first polarized laser output into a second polarized laser output and a third polarized laser output, the first polarized laser output having a coherence length, the second polarized laser output and the third polarized laser output having orthogonal polarizations and having intensities that are about equal;
   b. means for oscillating an optical path length of the second polarized laser output by an amplitude and with an oscillation frequency, the amplitude being at least about a half wavelength of the first polarized laser output;
   c. means for combining the second polarized laser output and the third polarized laser output into a fourth laser output; and
   d. a depolarizing screen coupled to the fourth laser output, the fourth laser output illuminating the depolarizing screen, the oscillation frequency being at least a sufficient frequency such that laser speckle is reduced.

18. The apparatus of claim 17 wherein the means for dividing comprises a polarizing beam splitter.

19. The apparatus of claim 18 wherein the means for combining comprises the polarized beam splitter.

20. The apparatus of claim 19 wherein the means for combining further comprises:
   a. a first mirror coupled to the second polarized laser output, the first minor reflecting the second polarized laser output back to the polarized beam splitter;
   b. a first quarter wave plate coupled to the second polarized laser output between the polarizing beam splitter and the first mirror such that a first polarization angle for the second polarized laser output is rotated by ninety degrees upon the second polarized laser output returning to the polarizing beam splitter;
   c. a second mirror coupled to the third polarized laser output, the second mirror reflecting the third polarized laser output back to the polarizing beam splitter; and
   d. a second quarter wave plate coupled to the third polarized laser output between the polarizing beam splitter and the second mirror such that a second polarization angle for the third polarized laser output is rotated by ninety degrees upon the third polarized laser output returning to the polarizing beam splitter.

21. The apparatus of claim 20 wherein the means for oscillating comprises a piezoelectric transducer coupled to the first mirror.

22. The apparatus of claim 19 wherein the means for combining further comprises a plurality of mirrors arranged such that the second polarized laser output returns to the polarizing beam splitter and further such that the second polarized laser output combines with the third polarized laser output to form the fourth laser output.

23. The apparatus of claim 22 wherein the means for oscillating comprises a piezoelectric transducer coupled to one of the mirrors.

24. A method of reducing laser speckle comprising the steps of:
  a. dividing a first polarized laser output into a second polarized laser output and a third polarized laser output, the second polarized laser output and the third polarized laser output having orthogonal polarizations and having intensities that are about equal;
  b. oscillating an optical path length for the second polarized laser output by an amplitude and with an oscillation frequency, the amplitude being at least about a half wavelength of the first polarized laser output;
  c. combining the second polarized laser output and the third polarized laser output into a fourth laser output; and
  d. illuminating a depolarizing screen with the fourth laser output, the oscillation frequency being at least a sufficient frequency such that laser speckle is reduced.

25. The method of claim 24 wherein the depolarizing screen comprises a diffuse reflecting surface.

26. The method of claim 24 wherein the depolarizing screen comprises a diffuse transmitting surface.

27. An apparatus for reducing laser speckle comprising:
  a. means for dividing a first polarized laser output into a second polarized laser output and a third polarized laser output, the second polarized laser output and the third polarized laser output having orthogonal polarizations and having intensities that are about equal;
  b. means for switching between a first optical path length and a second optical path length for the second polarized laser output, a difference between the first optical path length and the second optical path length being about an odd multiple of a half wavelength of the first polarized laser output;
  c. means for combining the second polarized laser output and the third polarized laser output into a fourth laser output;
  d. means for diverging the fourth laser output in a first direction to create a fifth laser output;
  e. a scanning mirror coupled to the fifth laser output, the scanning mirror reflecting the fifth laser output to create a line illumination; and
  f. a depolarizing screen illuminated by the line illumination, the scanning mirror repeatedly scanning the line illumination across a portion of the depolarizing screen such that the means for switching maintains the first optical path length for a first scan, switches to the second optical path length for a second scan, and alternates between the first optical path length and the second optical path length for subsequent scans.

28. The apparatus of claim 27 wherein the depolarizing screen comprises a diffuse reflecting surface.

29. The apparatus of claim 27 wherein the depolarizing screen comprises a diffuse transmitting surface.

30. A method of reducing laser speckle comprising the steps of:
  a. dividing a first polarized laser output into a second polarized laser output and a third polarized laser output, the second polarized laser output and the third polarized laser output having orthogonal polarizations and having intensities that are about equal;
  b. switching between a first optical path length and a second optical path length for the second polarized laser output, a difference between the first optical path length and the second optical path length being about an odd multiple of a half wavelength of the first polarized laser output;
  c. combining the second polarized laser output and the third polarized laser output into a fourth laser output;
  d. diverging the fourth laser output in a first direction; and
  e. scanning the fourth laser output in a second direction across a portion of a depolarizing screen in a first scan with the first optical path length, in a second scan with the second optical path length, and in subsequent scans alternating between the first optical path length and the second optical path length, the second direction being orthogonal to the first direction.

31. The method of claim 30 wherein the depolarizing screen comprises a diffuse reflecting surface.

32. The method of claim 30 wherein the depolarizing screen comprises a diffuse transmitting surface.

33. An apparatus, for reducing laser speckle comprising:
  a. means for dividing a first polarized laser output into a second polarized laser output and a third polarized laser output, the means for dividing comprising a polarizing beam splitter, the first polarized laser output having a coherence length, the second polarized laser output and the third polarized laser output having orthogonal polarizations and having intensities that are about equal;
  b. a light guide comprising a polarization preserving fiber optic, the light guide coupled to the second polarized laser output, the light guide creating an optical path difference between the second polarized laser output and the third polarized laser output, the optical path difference being at least about the coherence length;
  c. means for combining the second polarized laser output and the third polarized laser output into a fourth laser output, the means for combining comprising the polarizing beam splitter; and
  d. a depolarizing screen coupled to the fourth laser output.

* * * * *